(12) United States Patent
Yang

(10) Patent No.: US 6,552,514 B2
(45) Date of Patent: Apr. 22, 2003

(54) CHARGING DEVICE INCLUDING A MULTIPLE-STAGE VOLTAGE SOURCE FOR PROVIDING AUTOMATIC CONTROL OF CHARGING CURRENT

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/982,169

(22) Filed: Oct. 19, 2001

(65) Prior Publication Data

US 2003/0057921 A1 Mar. 27, 2003

(51) Int. Cl.⁷ .............................................. H01M 10/46
(52) U.S. Cl. ....................................................... 320/125
(58) Field of Search ................................ 320/124, 125, 320/160, 162, 164

(56) References Cited

U.S. PATENT DOCUMENTS

| 4,949,028 A | * | 8/1990 | Brune |
| 5,013,991 A | * | 5/1991 | Brune |
| 5,541,492 A | * | 7/1996 | Fernandez et al. |
| 5,900,717 A | * | 5/1999 | Lee |

* cited by examiner

Primary Examiner—Edward H. Tso
(74) Attorney, Agent, or Firm—Bacon & Thomas

(57) ABSTRACT

A charging device with a multi-step voltage charging source provides active control over charging source voltage to further control its output charging current in the course of charging process for a (dis)chargeable storage device so that when the (dis)chargeable storage device reaches a preset voltage, a primary control switch connected in series with the charging circuit detects and is driven by the preset voltage to execute cutoff so to stop charging the (dis)chargeable storage device.

28 Claims, 19 Drawing Sheets

CHARGING DEVICE INCLUDING A MULTIPLE-STAGE VOLTAGE SOURCE FOR PROVIDING AUTOMATIC CONTROL OF CHARGING CURRENT

BACKGROUND OF THE INVENTION (a) Field of the Invention

The present invention relates to a charging device with a multiple stage or "multi-step" voltage charging source, and more particularly to one that has a (dis)chargeable storage device on a load side that is charged by the multi-step charging source up to a preset voltage, after which the charging status is maintained by means of a smaller charging current supplied by a stage of the charging source with higher voltage, or the charging current is cut off by (i) operating a primary control switch connected in series with the charging circuit, or (ii) turning the primary switch connected in series with a charging circuit to an open circuit condition to thereby cut off charging of the (dis)chargeable storage device.

(b) Description of the Prior Art

A conventional single step voltage charging source usually requires an analog resistance device known to have high thermal loss for regulating and controlling output voltage and current, or a pulse-width-modulation (PWM) device known to generate higher electromagnetic interference (EMI) noise to regulate and control the output voltage and current. The charging device of the multi-step voltage charging source of the present invention, on the other hand, simultaneously reduces thermal loss and EMI noise level.

SUMMARY OF THE INVENTION

The primary purpose of the present invention is to provide a charging device with a multi-step voltage charging source that has a (dis)chargeable storage device on a load side to be charged by the multi-step charging source up to preset voltage, after which the charging status is maintained by a smaller charging current supplied by a stage of the charging source with higher voltage, or the charging current is cut off by operating a primary control switch connected in series with a charging circuit, or by turning the primary switch connected in series with a charging circuit to open circuit, thus cutting off charging of the (dis)chargeable storage device.

DETAILED DESCRIPTION OF THE PREFERRED EMBODIMENTS

A charging device with a multi-step voltage charging source according to the present invention has a (dis)chargeable storage device on a load side that is charged by the multi-step charging source up to a preset voltage, after which the charging status is maintained by a smaller charging current output by a stage of the charging source with higher voltage, or the charging current is cut off by operating a primary control switch connected in series with a charging circuit, or by opening the primary switch connected in series with the charging circuit and thereby cut off charging of the (dis)chargeable storage device.

The multi-step voltage charging source PS200 of the invention outputs two or more different voltages. Output terminals from the charging source PS200 with lower voltage are respectively connected in series with an inverse voltage limiting diode CR200 and respective series-connected resistance devices Z0, Z1 to jointly charge the (dis)chargeable storage device ESD100. Multi-step voltage charging source PS200 may be a DC source having two or more stages, a multi-stage rectified AC voltage source, or a multi-step DC voltage source comprised of a secondary AC output terminal, a transformer, and a rectifier. The charging source includes at least two units arranged to output different voltages V1 and V2, with V2 being the higher voltage, or more than two multi-step voltage charging sources of different voltages. The multi-stage charging sources of different voltages can be comprised of charging sources of the same or different current capacity, connected in series and having a positive polarity sequence, a common negative electrode, or a common positive electrode for outputting a preset voltage to a load comprised of a related charging control circuit via a conduction connector and the (dis)chargeable discharging device ESD100. Central control unit CCU200 includes a drive circuit containing an electromechanical switch or a solid-state power switch device to control conversion of the DC output voltage and On-Off or timed cutoff. The central control unit CCU200 controls the operation of converting voltage output by the DC source PS200 into a required DC output voltage by means of its internal electromechanical switch or solid-state power switch; or controls the operation of a primary control switch SW1 comprised of a solid state or analog switching device, an electromechanical switching device, or a constantly closed thermal temperature switch, by controlling the drive circuit to execute On-Off operation or timed cutoff, thus further controlling the On-Off operation of the charging DC source and the output of timed cutoff. The drive circuit is optional and any or all of the above functions.

The (dis)chargeable storage device ESD100 may include a Ni—Cd, Ni—H, Ni—Zn, Ni—Fe or Lithium, or lead storage battery, or any other (dis)chargeable secondary battery functioning as a charging source or a load to be charged.

Figure 1:
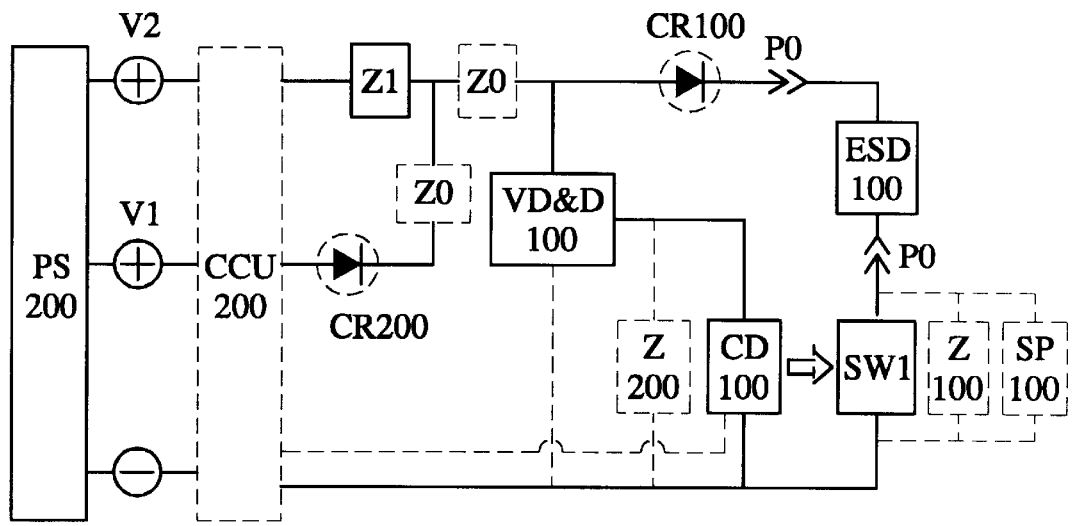
FIG. 1 is a block diagram of a circuit for a charging device with a multi-step voltage charging source according to the present invention.
Figure 2:
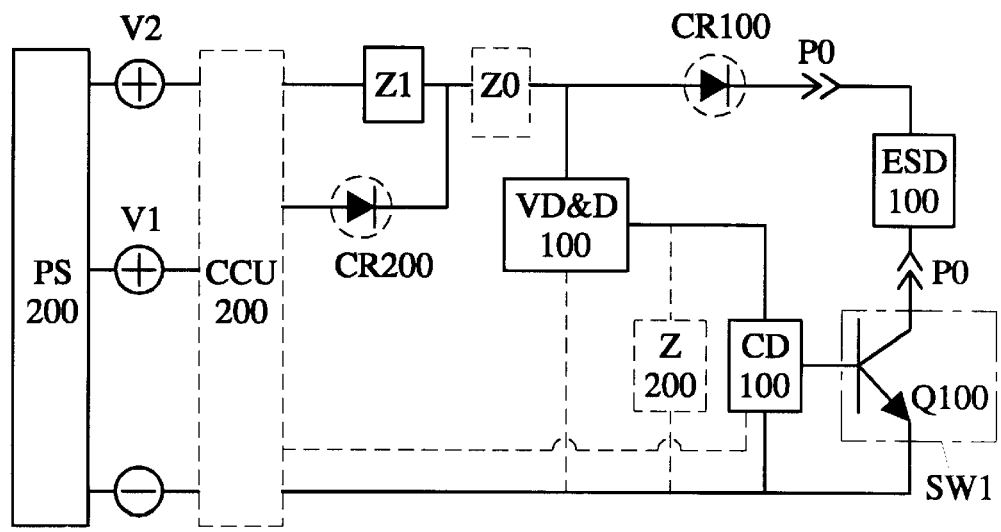
FIG. 2 is a schematic view of a circuit of a primary control switch taken from FIG. 1 that is comprised of a solid state or analog switching device.

(1) Primary switch SW1 may include a solid state or analog switching device, an electromechanical switching device, or a constantly closed thermal temperature switch. For example the primary control switch SW1 may be comprised of a solid-state or analog switching device Q100 optionally driven by a pilot drive device CD100 comprised of an electromechanical or solid-state electronic device for opening the solid-state analog or switching device Q100 once the (dis)chargeable storage device ESD100 is charged up to the preset voltage; or further for controlling the circuit break operation when the resistance of a selected device gradually increases in the course of voltage rise detection, as illustrated in FIG. 2.

Figure 3:
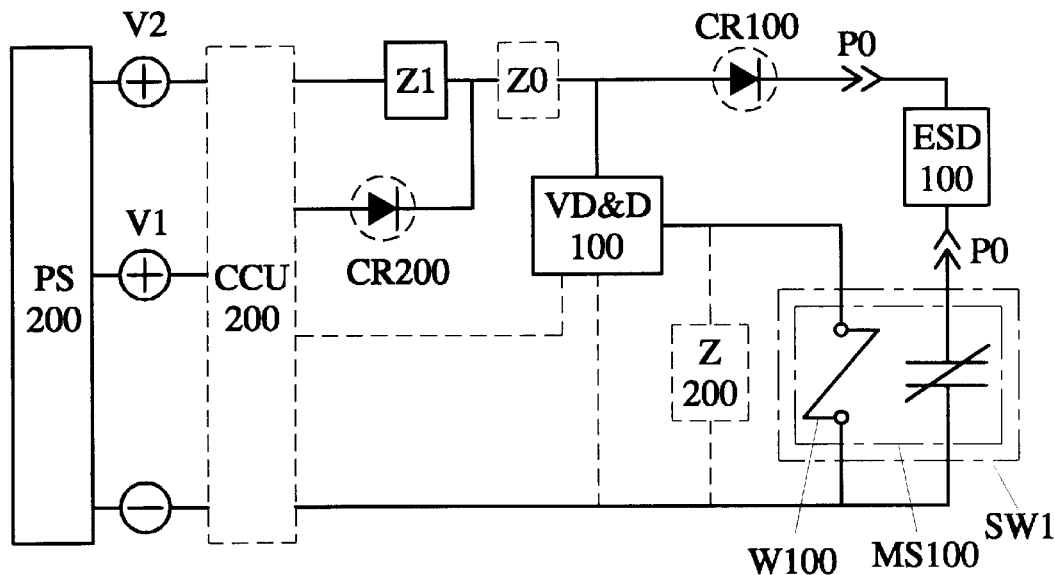
FIG. 3 is a schematic view of a circuit of a primary control switch taken from FIG. 1 that is comprised of an electro-mechanical switching device.

FIG. 3 shows an embodiment in which the primary control switch SW1 is an electromechanical switching device MS100 with its operation controlled by an electric energy driven coil W100 so that when the (dis)chargeable storage device ESD100 is charged up to the preset voltage, the electric energy driven coil W100 controls the operation of the primary control switch SW1 comprised of the electromechanical switching device MS100 to cut off charging of the (dis)chargeable storage device ESD100.

Figure 4:
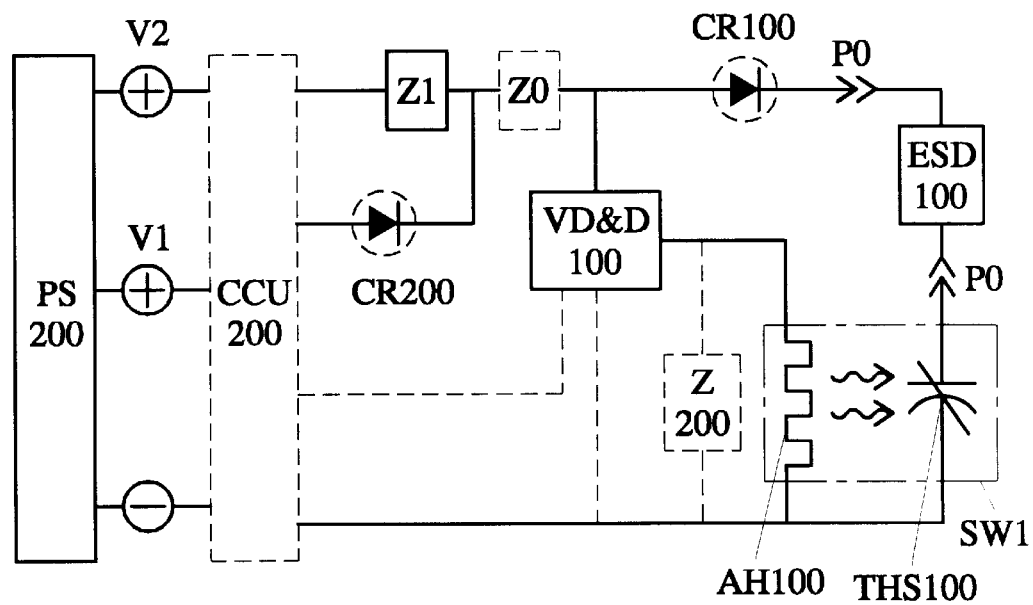
FIG. 4 is a schematic view of a circuit of a primary control switch taken from FIG. 1 that is comprised of a constantly closed thermal temperature switch.

As illustrated in FIG. 4, the primary control switch may alternatively include a constantly closed thermal temperature switch THS100 containing a thermal bi-metal tab or memory alloy with equivalent function, a pilot drive function being executed by the primary control switch SW1 and an electric heating device AH100 coupled to the constantly closed thermal temperature switch THS100, and subject to control by preset voltage detection and drive circuit VD&D100 to convert the inputted electric energy into thermal energy so as to heat and thereby cause the coupled constantly closed thermal temperature switch THS100 to open, thereby cutting off the charging current to the (dis)chargeable storage device ESD100. Once the temperature drops to a critical temperature, the contact returns to a closed circuit condition.

Optional resistance device Z0 may be an electromechanical resistance device or a solid-state resistance device, a diode, or other resistive device that converts electric energy into thermal energy, and is connected in series with the output terminal of the charging source V1 having the lower voltage to execute differential current limitation as required by the circuit.

Optional resistance device Z1 may also be an electromechanical resistance device or a solid-state resistance device, a diode, or any other device provided that converts electric energy into thermal energy, connected in series with the output terminal of the charging source V2 having the lower voltage and connected in series with the resistance device Z0 or in parallel with the resistance device Z0 before being outputted to the load to execute differential current limitation. The value of the resistance device Z1 is increased depending on which stage of the voltage charging source is to be connected in series with the output terminal of the voltage source.

Set voltage detection and drive circuit VD&D100 includes an electromechanical or solid-state electronic device, provided as an option to be connected in parallel with both terminals of a DC charging source or (dis) chargeable storage device ESD100. Set voltage detection and drive circuit VD&D100 does not function when the (dis)chargeable storage discharging device ESD100 is at its low voltage status during initial charging. Later, the charging source V2 with higher voltage takes over when the terminal voltage of the (dis)chargeable storage device ESD100 is higher than that of the charging source V1 with the lower voltage, and the value of the divided current in increased by driving the set voltage detection and drive device VD&D100 when the charging voltage from the (dis)chargeable storage device ESD100 rises up to approach the preset voltage, thereby increasing the current flowing through the resistance device Z1 (or the resistance device Z0 connected in series with it) connected in series with the charging source V2 with higher voltage, and further increasing the voltage drop at the resistance device Z1 (or the resistance device Z0 connected in series with it) for reducing the voltage to the (dis)chargeable storage device ESD100. The charging current is thus changed to drive the primary control switch SW1 connected in series with the charging circuit to cut off the charging current to the (dis)chargeable storage discharging device ESD100 when its terminal voltage reaches the preset voltage.

The set voltage detection and drive circuit VD&D100 is provided to (1) drive a dedicated pilot drive power control device CD100 comprised of a solid-state circuit device or an electromechanical device to drive a primary control switch SW1 comprised of a solid-state switching device Q100, which in turn is comprised of transistor and a gate voltage device SCR; or (2) drive a dedicated pilot drive power control device CD100 comprised of a drive coil W100 from a mechanic-electronic switching device MS100 to control a primary control switch SW1 comprised of the solid-state switching device MS100; or (3) drive and heat up a dedicated pilot drive power control device CD100 comprised of electric heating device AH100, and further to drive the primary control switch SW1 comprised of the constantly closed thermal temperature switch THS100.

An optional limiting resistance Z100 is made up of an electromechanical or solid-state electronic resistance device, diode or any other device that converts electric energy into thermal energy when a subsequent small current make-up charge is required to be executed by the (dis)chargeable storage device. The limit resistance Z100 is connected in parallel with both terminals of the primary current contact of the primary control switch SW1 so that when the primary control switch SW1 is interrupted, the DC charging source continues to execute small current charging to the (dis) chargeable storage device through the limit resistance Z100. Optional spark arresting device SP100 is comprised of a resistance capacitor or semi-conductor spark arresting device to be directly connected in parallel with both terminals of the contact of the constantly closed thermal temperature switch THS100 depending on the polarity of the source, or a limit resistance Z100 may be connected in series before the parallel connection so to arrest sparks and inhibit EMI noise when the constantly closed thermal temperature switch THS100 contact changes from constantly closed to constantly opened. Optional conduction contact (or plug-socket unit) P0 may include an electromechanical structure with one terminal connected to a charging source and a corresponding circuit on the source side, the other terminal being coupled to connect the (dis)chargeable storage device ESD100 and its related circuit on the load side.

Optional isolating diode CR100 includes at least one diode to be connected in series or series-parallel between the charging source and the (dis)chargeable storage device; or when required, at least one diode connected in series or series-parallel to regulate the output voltage of the DC source by means of a positive voltage drop.

An optional inverse voltage prevention diode CR200 is arranged to be positive-sequence connected in series with the output terminal of the lower charging source voltage V1 or any other voltage output by a lower stage to prevent inverse voltage; or alternatively, at least one diode arranged to prevent inverse voltage is connected in series or series-parallel by taking advantage of their positive-sequence voltage drop to regulate the output voltage of the DC source.

An optional secondary resistance Z200 made up of a resistive or inductive resistance device, or a mix of both, or any other resistance device is connected in parallel with both terminals of the pilot drive power control device CD100 to execute current division so to gradually reduce the charging current to the (dis)chargeable storage device on the load side, leaving the dedicated pilot drive power control device CD100 to control the operation of an analog or switching type transistor, MOSFET, IGBT, PUB or gate voltage device SCR, or other solid-state or analog switching device Q100.

Figure 5:
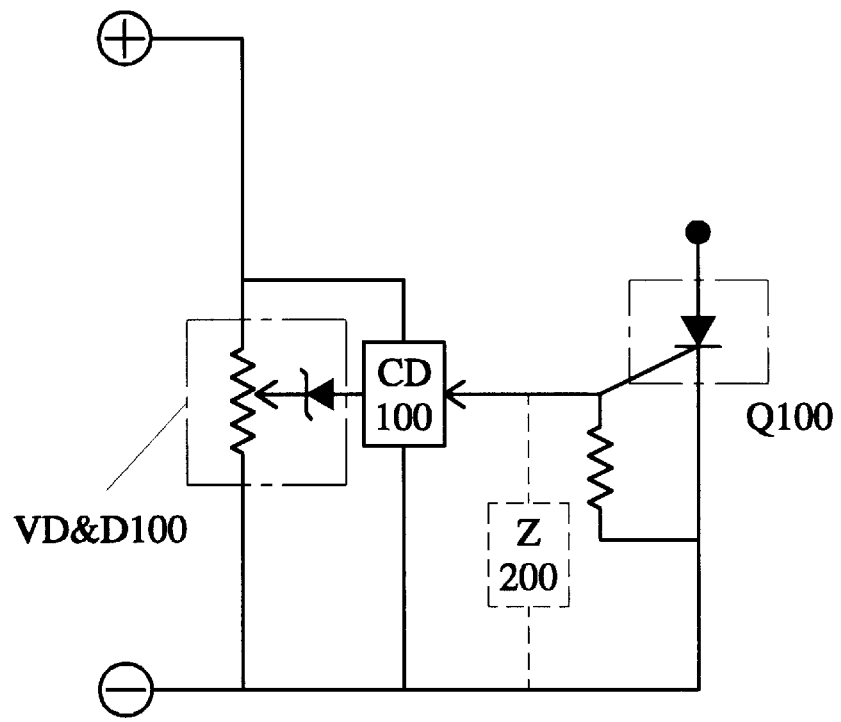
FIG. 5 is a schematic view of a circuit of the present invention having its primary control switch comprised of a gate voltage device SCR and a matching circuit device.
Figure 6:
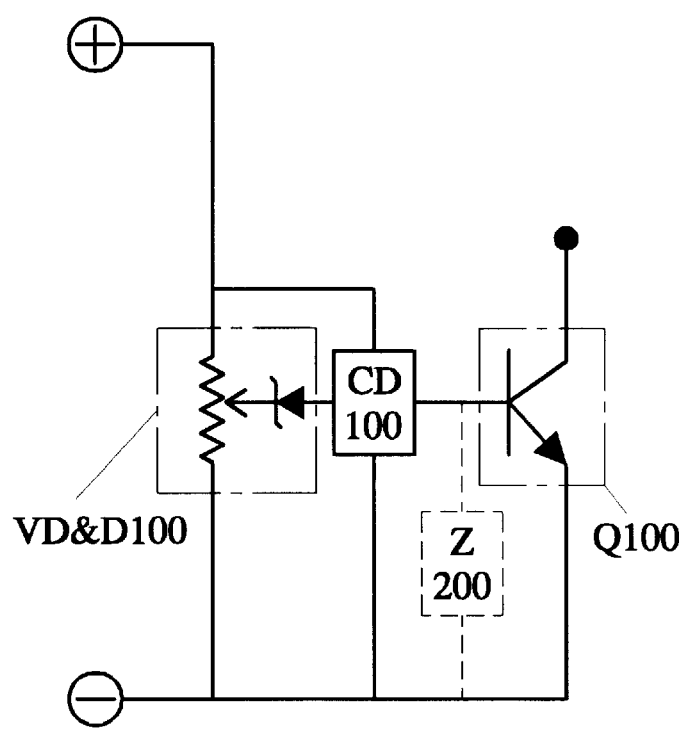
FIG. 6 is a schematic view of a circuit of the present invention having its primary control switch comprised of a gate voltage device SCR and an additional relay transistor.

FIG. 5 is a schematic view showing a circuit of the present invention comprised of a gate voltage device SCR as the primary control switch and its matching related circuit devices, and FIG. 6 is a schematic view showing a circuit of the present invention comprised of a gate voltage device SCR as the primary control switch and additional relay transistors.

Figure 7:
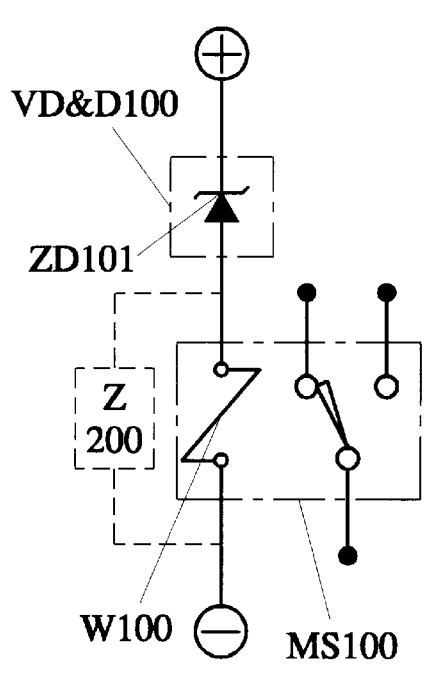
FIG. 7 is a schematic view of a circuit of the present invention having its primary control switch comprised of an electromechanical switch and a matching circuit device.

FIG. 7 is a schematic view showing a circuit of the present invention comprised of an electromechanical switch as the primary control switch and its matching related circuit devices, and in which a differential zener diode ZD101 is connected in series with the drive coil W100 of the electromechanical switch and the secondary resistance Z200 is provided to be connected in parallel with both terminals of the drive coil W100.

Figure 8:
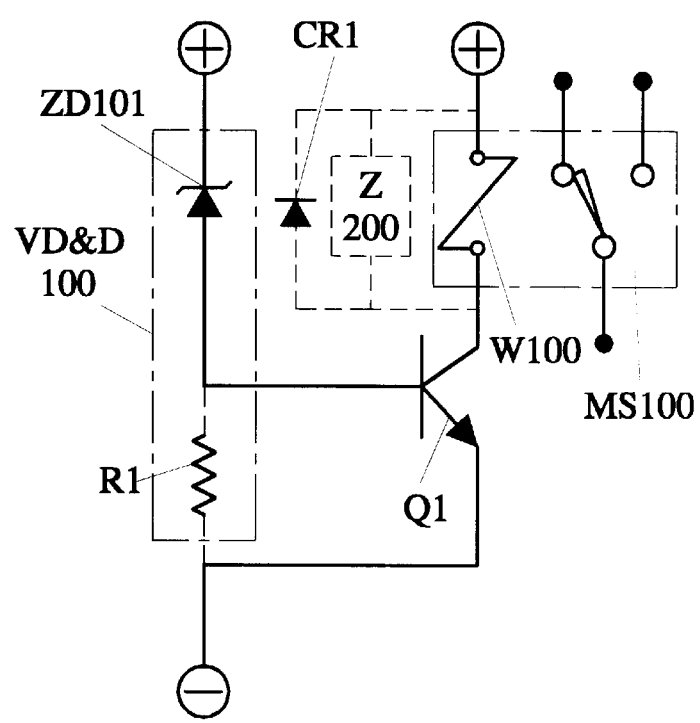
FIG. 8 is a schematic view of a circuit of the present invention having its primary control switch comprised of an electromechanical switch gate voltage device SCR and an additional relay transistor.

FIG. 8 is a schematic view showing a circuit of the present invention comprised of an electromechanical switch as the primary control switch and an additional relay transistor, in which the differential zener diode ZD101 is connected in series with a differential resistance R1 to drive the relay transistor Q1. The secondary resistance Z200 is connected in parallel with both terminals of the drive coil W100, and the drive coil W100 is connected in parallel with a flywheel diode CR1 as required before being connected in series with the relay transistor Q1, to regulate the division ratio for gradually reducing the charging current to the load side (dis)chargeable storage device while the operation of the electromechanical switching device MS100 is controlled by the drive coil W100.

Figure 9:
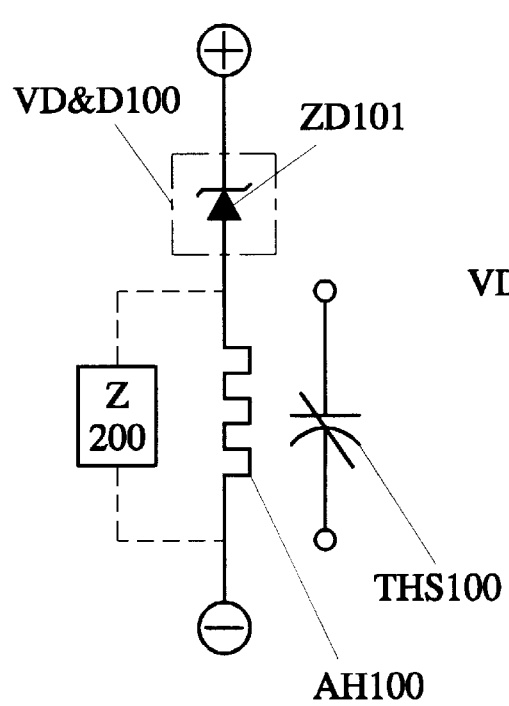
FIG. 9 is a schematic view of a circuit of the present invention having its primary control switch comprised of a constantly closed thermal temperature switch and a matching circuit device.

FIG. 9 is a schematic view showing a circuit of the present invention comprised of a constantly closed thermal temperature switch as the primary control switch and its matching related circuit devices. The secondary resistance Z200 is connected in parallel with both terminals of a heating device AH100 controlled by a dedicated pilot drive power control device CD100.

Figure 10:
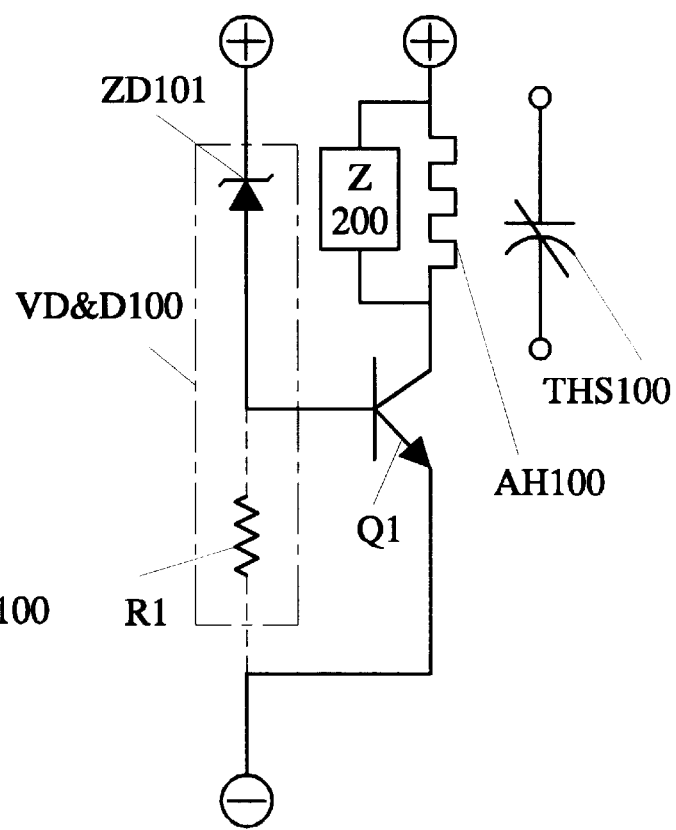
FIG. 10 is a schematic view of a circuit of the present invention having its primary control switch comprised of a constantly closed thermal temperature switch and an additional relay transistor.

FIG. 10 is a schematic view showing a circuit of the present invention comprised of a constantly closed thermal temperature switch as the primary control switch and an additional relay transistor. Within, the secondary resistance Z200 is connected in parallel with both terminals of the heating device AH100 driven by the relay transistor Q1 to regulate the division ratio for gradually reducing the charging current to the load side (dis)chargeable storage discharging device. The operation of the relay transistor Q1 connected in series with the heating device AH100 is controlled by the dedicated pilot drive power control device CD100, and the operation of the constantly closed thermal temperature switch THS100 is controlled by the heating device AH100.

As required, a segregation is provided for the charging device of the multi-step voltage charging source of the present invention by providing a conduction contact (or a plug-socket unit) P0 situated where its primary control switch is provided, and to enable the set voltage detection and drive circuit VD&D100 and the pilot drive power control device CD100 to be further configured according to the preferred embodiments illustrated in FIGS. 11 through FIG. 16.

Figure 11:
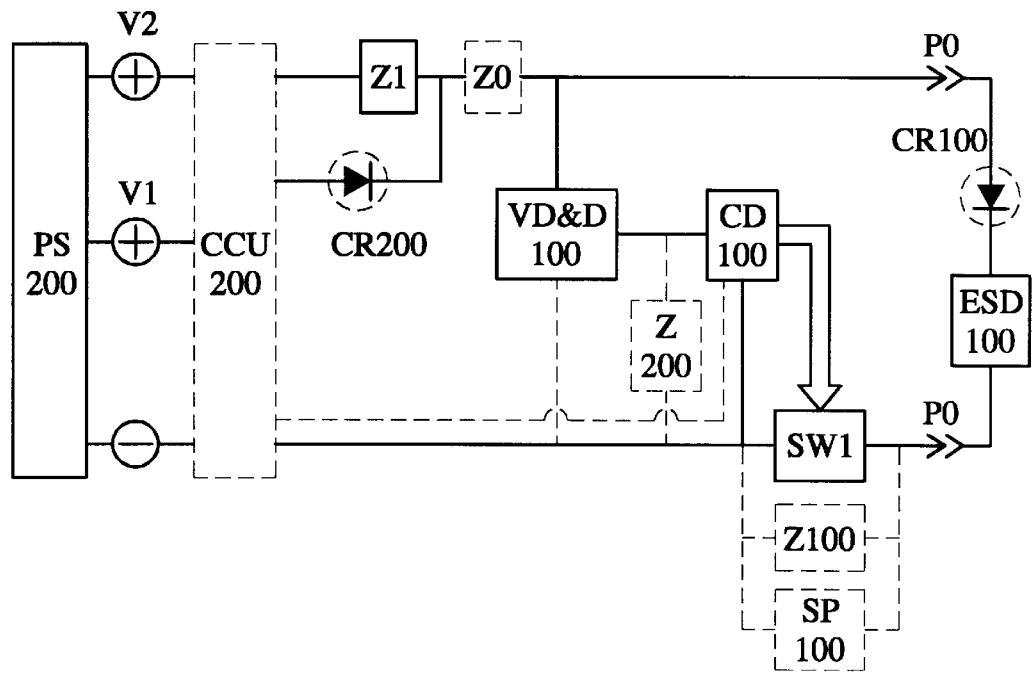
FIG. 11 is a second block diagram of a circuit for the charging device with multi-step voltage charging source of the present invention.

FIG. 11 shows a second block diagram of a multi-stage voltage charging source PS200, including a DC source having two or more stages, a multi-stage rectified AC voltage source, or a multi-step DC voltage source comprised of a secondary AC output terminal, a transformer, and a rectifier. The charging source further includes at least two units arranged to output different voltages V1 and V2, with V2 being the higher voltage, or more than two multi-step voltage charging sources of different voltages. The multi-stage charging sources of different voltages can be comprised of charging sources of the same or different current capacity, connected in series and having a positive polarity sequence, a common negative electrode, or a common positive electrode for outputting a preset voltage to a load comprised of a related charging control circuit via a conduction connector and the (dis)chargeable discharging device ESD100.

Central control unit CCU200 includes a drive circuit containing an electromechanical switch or a solid-state power switch device to control conversion of the DC output voltage and On-Off or timed cutoff. The central control unit CCU200 controls the operation of converting voltage output by the DC source PS200 into a required DC output voltage by means of its internal electromechanical switch or solid-state power switch; or controls the operation of a primary control switch SW1 comprised of a solid state or analog switching device, an electromechanical switching device, or a constantly closed thermal temperature switch, by controlling the drive circuit to execute On-Off operation or timed cutoff, thus further controlling the On-Off operation of the charging DC source and the output of timed cutoff. The drive circuit is optional and any or all of the above functions.

An optional inverse voltage prevention diode CR200 is arranged to be positive-sequence connected in series with the output terminal of the charging source V1 having the lower voltage or any other voltage from a lower stage to prevent inverse voltage; or alternatively, one or more than one diodes to prevent inverse voltage are connected in series or series-parallel by taking advantage of their positive-sequence voltage drop to regulate the output voltage of the DC source.

Optional resistance device Z1 may also be an electromechanical resistance device or a solid-state resistance device, a diode, or any other device provided that converts electric energy into thermal energy, connected in series with the output terminal of the charging source V2 having the lower voltage and connected in series with the resistance device Z0 or in parallel with the resistance device Z0 before being outputted to the load to execute differential current limitation. The value of the resistance device Z1 is increased depending on which stage of the voltage charging source is to be connected in series with the output terminal of the voltage source.

Optional resistance device Z0 may be an electromechanical resistance device or a solid-state resistance device, a diode, or other resistive device that converts electric energy into thermal energy, and is connected in series with the output terminal of the charging source V1 having the lower voltage to execute differential current limitation.

In addition, a voltage limiting resistance device may be optionally provided, as well as other optional devices including, as discussed above, related set voltage detection and drive device VD&D100, a pilot drive power control device CD100, isolating diode CR100, primary control switch SW1, limiting resistance Z100, spark arresting device SP100, secondary resistance Z200, and conduction contact (or plug-socket unit) P0. The primary control switch SW1 is provided on the charging source side to control the operation of the charging source side, and to further control charging of the (dis)chargeable storage device ESD100 by means of the conduction contact (or plug-socket unit) P0. The set voltage detection and drive circuit VD&D100 is connected in parallel on the charging source side to control the operation of the pilot drive power controller CD100, and further to control the operation of the primary control switch SW1 (which is comprised of a solid-state or analog switching device Q100, an electromechanical switching device MS100, or a constantly closed thermal temperature switch THS100) provided on the source side.

Figure 12:
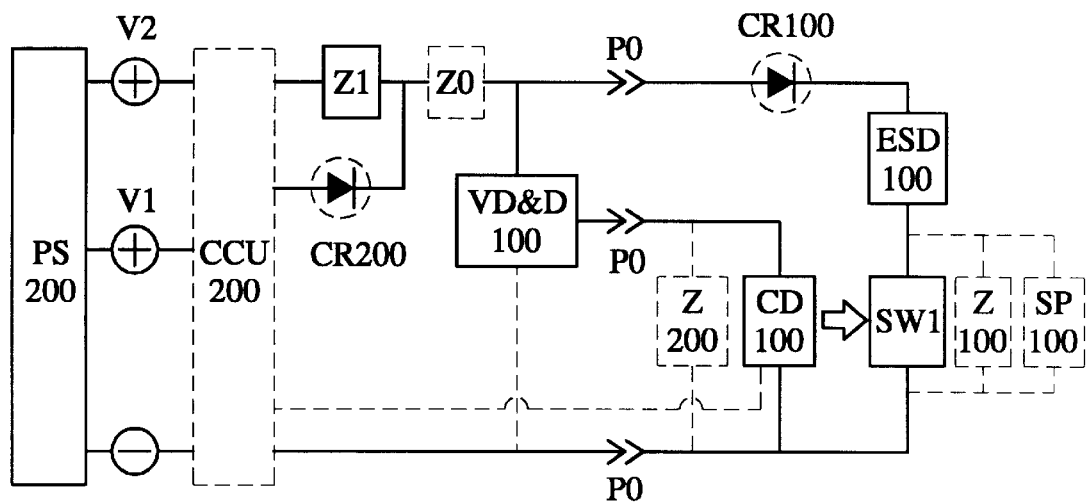
FIG. 12 is a third block diagram of a circuit for the charging device with multi-step voltage charging source of the present invention.

FIG. 12 is a third block diagram of a circuit for the charging device with multi-step voltage charging source of the present invention. The circuit is comprised of the stage voltage charging source PS200, a central control unit CCU200, an inverse voltage prevention diode CR200, a resistance device Z1 and a resistance Z0 as also illustrated in FIG. 11, and other optional devices including related set voltage detection and drive device VD&D100, pilot drive power control device CD100, the isolating diode CR100, the primary control switch SW1, limiting resistance Z100, spark arresting device SP100, secondary resistance Z200, (dis) chargeable storage discharging device ESD100, and conduction contact (or plug-socket unit) P0. The primary control switch SW1 is provided to control the operation of the load side. The set voltage detection and drive circuit VD&D100 is connected in parallel on the charging source side and controls the operation of the pilot drive power controller CD100 through the conduction contact (or plug-socket unit) P0, and further controls the operation of the primary control switch SW1 (which is comprised of solid-state or analog switching device Q100, an electromechanical switching device MS100, or a constantly closed thermal temperature switch THS100) provided on the load side to control charging of the (dis)chargeable storage device ESD100.

Figure 13:
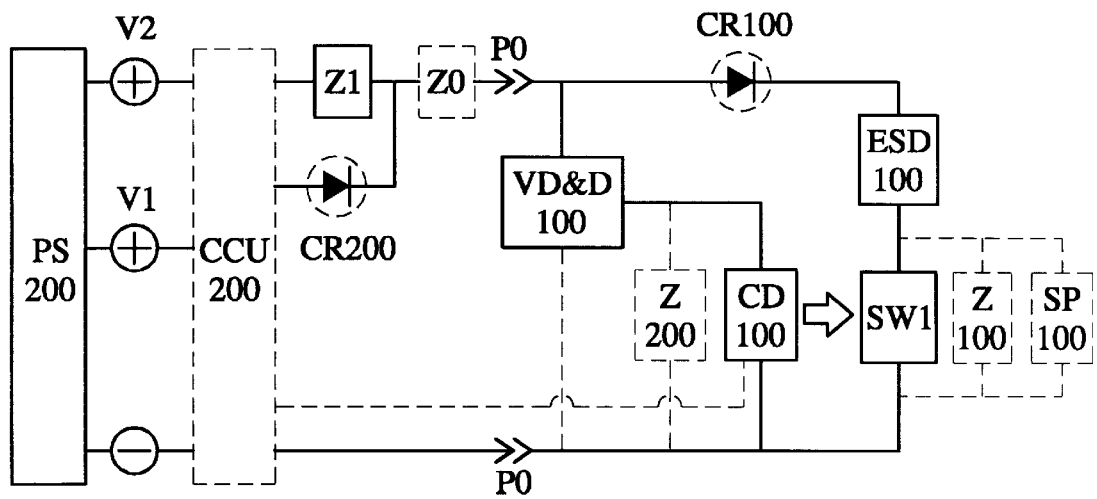
FIG. 13 is a fourth block diagram of a circuit for the charging device with multi-step voltage charging source of the present invention.

FIG. 13 is a fourth block diagram of a circuit for the charging device with voltage charging source of the present invention. The circuit is comprised of the multi-step voltage charging source PS200, central control unit CCU200, inverse voltage prevention diode CR200, resistance device Z1 and the resistance Z0 as illustrated in FIG. 11, and other optional devices including related set voltage detection and drive device VD&D100, pilot drive power control device CD100, isolating diode CR100, primary control switch SW1, limiting resistance Z100, spark arresting device SP100, secondary resistance Z200, (dis)chargeable storage device ESD100, and conduction contact (or plug-socket unit) P0. The primary control switch SW1 is provided on the load side to control the operation of the load side. The set voltage detection and drive circuit VD&D100 and the pilot drive power control device CD100 connected to it are provided on the load side to control the operation of the primary control switch SW1 (comprised of solid-state or analog switching device Q100, electromechanical switching device MS100, or constantly closed thermal temperature switch THS100) on the load side through the conduction contact (or plug-socket unit) P0, and further to control charging of the (dis)chargeable storage device ESD100.

Figure 14:
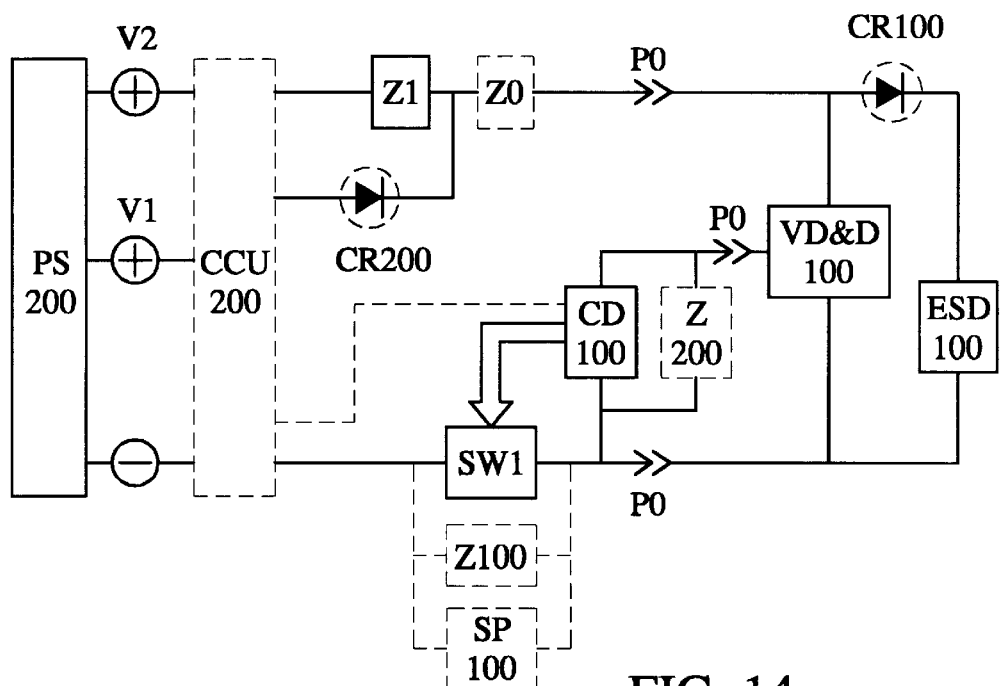
FIG. 14 is a fifth block diagram of a circuit for the charging device with multi-step voltage charging source of the present invention.

FIG. 14 is a fifth block diagram of a circuit for the charging device with multi-step voltage charging source of the present invention. The circuit is comprised of the multi-step voltage charging source PS200, central control unit CCU200, inverse voltage prevention diode CR200, resistance device Z1 and resistance Z0 as illustrated in FIG. 11, and other optional devices including related set voltage detection and drive device VD&D100, pilot drive power control device CD100, isolating diode CR100, primary control switch SW1, limiting resistance Z100, spark arresting device SP100, secondary resistance Z200, (dis) chargeable storage device ESD100, and conduction contact (or plug-socket unit) P0. The primary control switch SW1 is provided on the load side to control the operation of the charging source side. The set voltage detection and drive circuit VD&D100 and the pilot drive power controller CD100 connected to it are provided on the load side to control the operation of the primary control switch SW1 (which may be comprised of solid-state or analog switching device Q100, electromechanical switching device MS100, or constantly closed thermal temperature switch THS100) provided on the source side through the conduction contact (or plug-socket unit) P0, and further controls charging of the (dis)chargeable storage device ESD100.

Figure 15:
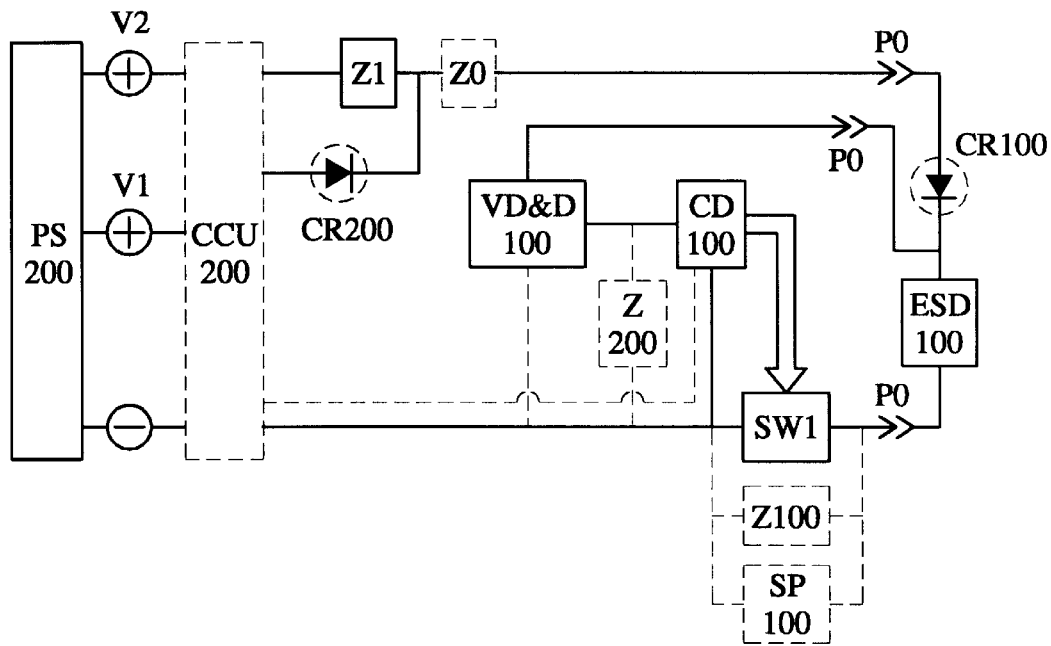
FIG. 15 is a sixth block diagram of a circuit for the charging device with multi-step voltage charging source of the present invention.

FIG. 15 is a sixth block diagram of a circuit for the charging device with multi-step voltage charging source of the present invention. The circuit is comprised of the multi-step voltage charging source PS200, central control unit CCU200, inverse voltage prevention diode CR200, resistance device Z1 and resistance Z0 as illustrated in FIG. 11, and other optional devices including related set voltage detection and drive device VD&D100, pilot drive power control device CD100, isolating diode CR100, primary control switch SW1, limiting resistance Z100, spark arresting device SP100, secondary resistance Z200, (dis) chargeable storage device ESD100, and conduction contact (or plug-socket unit) P0. The set voltage detection and drive circuit VD&D100 and the pilot drive power controller CD100 have one terminal connected to the DC charging source side and the other terminal to the load side. The set voltage detection and drive circuit VD&D100 controls the operation of the pilot drive power controlled device CD100 connected to it, the operation of the primary control SW1 provided on the source side, and further the operation of the primary control switch SW1 (which may be comprised of solid-state or analog switching device Q100, electromechanical switching device MS100, or constantly closed thermal temperature switch THS100) provided on the load side, to thereby control charging of the (dis)chargeable storage device ESD100 through the conduction contact (or plug-socket unit) P0.

Figure 16:
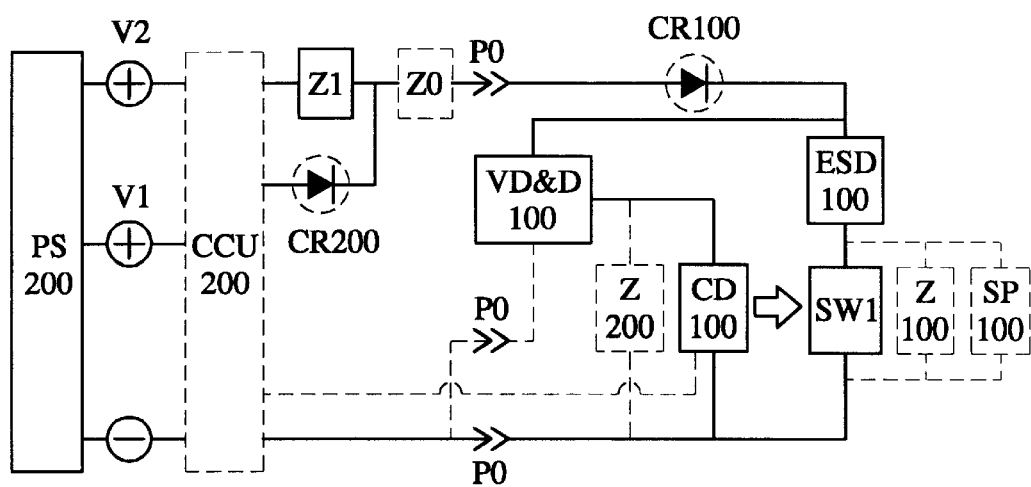
FIG. 16 is a seventh block diagram of a circuit of the charging device with multi-step voltage charging source of the present invention.

FIG. 16 is a seventh block diagram of a circuit of the charging device with multi-step voltage charging source of the present invention. The circuit is comprised of the multi-step voltage charging source PS200, central control unit CCU200, inverse voltage prevention diode CR200, resistance device Z1 and resistance Z0 as illustrated in FIG. 11, and other optional devices including related set voltage detection and drive device VD&D100, pilot drive power control device CD100, isolating diode CR100, primary control switch SW1, limiting resistance Z100, spark arresting device SP100, secondary resistance Z200, (dis) chargeable storage device ESD100, and conduction contact (or plug-socket unit) P0. The set voltage detection and drive circuit VD&D100 and pilot drive power controller CD100 connected to it have one terminal connected to the DC charging source side and the other terminal to the load side. The set voltage detection and drive circuit VD&D100 controls the operation of the pilot drive power control device CD100, and therefore the operation of the primary control switch SW1 (comprised of solid-state or analog switching device Q100, electromechanical switching device MS100, or constantly closed thermal temperature switch THS100) provided on the load side to control charging of the (dis) chargeable storage device ESD100.

The optional set voltage detection & drive circuit VD&D100 as disclosed in those preferred embodiments of the present invention is connected in parallel on the load side and incorporated with the (dis)chargeable storage discharging device ESD100 or in parallel on the load side and separated from the (dis)chargeable storage discharging device ESD100. In addition, both the set voltage detection & drive circuit VD&D100 and the circuit of the pilot drive power control device CD100 may be connected to each other and then further connected in parallel on the load side, the set voltage detection & drive circuit controlling the operation of the pilot drive power controlled device CD100 connected to it; or both the set voltage detection & drive circuit VD&D100 and the pilot drive power control device CD100 maybe connected to each other or in parallel on the load side, the set voltage detection & drive circuit controlling the operation of the pilot drive power controlled device CD100 connected to it.

When a constantly closed thermal temperature switch THS100 is used as the primary control switch SW1, the constantly closed thermal temperature switch THS100 may be connected in series on the load side of the output so as to be directly connected in series with the (dis)chargeable storage discharging device ESD100. The constantly thermal temperature switch THS100 provides a good thermocouple structure with the (dis)chargeable storage device ESD100 to protect the latter during charging from excess current. Alternatively, the constantly closed contact of the constantly closed thermal temperature switch THS100 may be connected in series on the load side of the output so as to be directly connected in series with the (dis)chargeable storage device ESD100. The constantly closed thermal temperature switch THS100 is separated from the (dis)chargeable storage discharging device ESD100 to protect the latter during charging from excess current. Still further, the constantly closed contact of the constantly closed thermal temperature switch THS100 may be connected in series on the source side so as to be connected in series with charging source. In that case, the constantly thermal temperature switch THS100 again provides a good thermocouple structure with the (dis)chargeable storage device ESD100 to protect the latter during charging and from excess current. Finally, the constantly closed contact of the constantly closed thermal temperature switch THS100 may be connected in series on the source side so as to be connected in series with the charging source. The constantly thermal temperature switch THS100 is separated from the (dis)chargeable storage discharging device ESD100 to protect the latter from overcurrents during charging.

If make-up charging is not required after the charging current is cut by the primary control switch SW1, the limiting resistance Z100 is not required. However, if small current make-up charging is required after the charging current is cut by the primary control switch SW1, limiting resistance Z100 is connected in parallel with both terminals of the contact for control and operation of the primary control switch SW1 so that when the primary control switch SW1 is opened, the limiting resistance Z100 executes small current make-up charging of the (dis)chargeable storage device ESD100. Alternatively, the limiting resistance Z100 is provided in a structure separated from the primary control switch SW1; or the limiting resistance Z100 may form an open common structure with the primary control switch SW1 when switch SW1 is comprised of the constantly closed thermal switch THS100 as so to keep the primary control switch SW1 from being constantly heated to maintain the closed status by means of the thermal energy generated from electric heating; or the limiting resistance Z100 may for a sealed common structure thermally coupled with the primary control switch SW1 comprised of the constantly closed thermal switch THS100 so as to keep the primary control switch SW1 from being constantly heated to maintain the closed status.

The primary control and set voltage detection & drive circuit of the charging device with multi-step charging source of the present invention may be replaced by a voltage divider circuit device with a selectable conduction voltage connected in parallel with an output terminal so that when the output terminal or the (dis)chargeable storage discharging device ESD100 being charged arrives at the selected voltage, a divided current and voltage are created by the voltage divider circuit.

Figure 17:
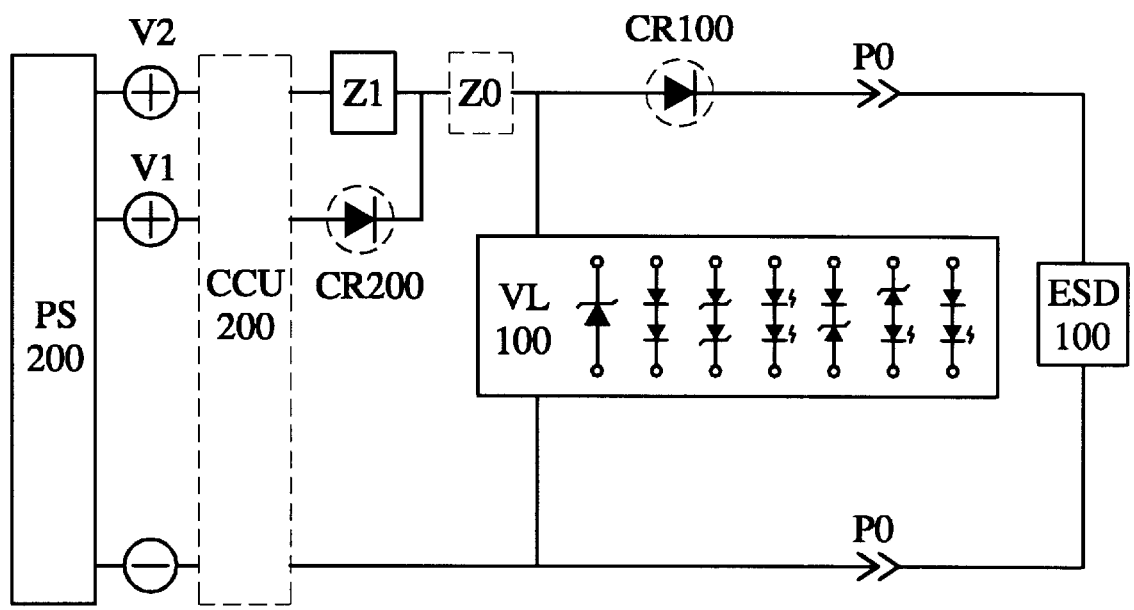
FIG. 17 is a schematic view showing a preferred embodiment of the present invention having its output terminal connected in parallel with a current dividing device having a selectable conduction voltage.

FIG. 17 is a schematic view showing a preferred embodiment of the present invention having its output terminal connected in parallel with a voltage divider circuit. The charging circuit of this embodiment includes a multi-step voltage charging source PS200, which may be a DC source having two or more stages, a multi-stage rectified AC voltage source, or a multi-step DC voltage source comprised of a secondary AC output terminal a transformer, and a rectifier. The charging source includes at least two units arranged to output different voltages V1 and V2, with V2 being the higher voltage, or more than two multi-step voltage charging sources of different voltages. The multi-stage charging sources of different voltages can be comprised of charging sources of the same or different current capacity, connected in series and having a positive polarity sequence, a common negative electrode, or a common positive electrode for outputting a preset voltage to a load comprised of a related charging control circuit via a conduction connector and the (dis)chargeable discharging device ESD100.

Central control unit CCU200 includes a drive circuit containing an electromechanical switch or a solid-state power switch device to control conversion of the DC output voltage and On-Off or timed cutoff. The central control unit CCU200 controls the operation of converting voltage output by the DC source PS200 into a required DC output voltage by means of its internal electromechanical switch or solid-state power switch; or controls the operation of a primary control switch SW1 comprised of a solid state or analog switching device, an electromechanical switching device, or a constantly closed thermal temperature switch, by controlling the drive circuit to execute On-Off operation or timed cutoff, thus further controlling the On-Off operation of the charging DC source and the output of timed cutoff. The drive circuit is optional and any or all of the above functions.

The (dis)chargeable storage device ESD100 may include a Ni—Cd, Ni—H, Ni—Zn, Ni—Fe or Lithium, or lead storage battery, or any other (dis)chargeable secondary battery functioning as a charging source or a load to be charged.

Optional resistance device Z0 may be an electromechanical resistance device or a solid-state resistance device connected to the output terminal of the source to execute a differential limiting function with respect to the load side.

Optional resistance device Z1 may also be an electromechanical resistance device or a solid-state resistance device, a diode, or any other device provided that converts electric energy into thermal energy, connected in series with the output terminal of the charging source V2 having the lower voltage and connected in series with the resistance device Z0 or in parallel with the resistance device Z0 before being outputted to the load to execute differential current limitation. The value of the resistance device Z1 is increased depending on which stage of the voltage charging source is to be connected in series with the output terminal of the voltage source.

Optional conduction contact (or plug-socket unit) P0 may include an electromechanical structure with one terminal connected to a charging source and a corresponding circuit on the source side, the other terminal being coupled to connect the (dis)chargeable storage device ESD100 and its related circuit on the load side.

Optional isolating diode CR100 includes at least one diode to be connected in series or series-parallel between the charging source and the (dis)chargeable storage device; or when required, at least one diode connected in series or series-parallel to regulate the output voltage of the DC source by means of a positive voltage drop.

An optional inverse voltage prevention diode CR200 is arranged to be positive-sequence connected in series with the output terminal of the lower charging source voltage V1 or any other voltage output by a lower stage to prevent inverse voltage; or alternatively, at least one diode arranged to prevent inverse voltage is connected in series or series-parallel by taking advantage of their positive-sequence voltage drop to regulate the output voltage of the DC source. Voltage divider circuit device with selectable conduction voltage VL100 provides selectable conduction voltage and current dividing current functions such as the provision of: (1) a zener voltage from a zener diode as the conduction voltage, (2) a positive-sequence voltage drop from a diode as the conduction voltage, (3) an reverse-sequence voltage drop from a diode, (4) a positive-sequence voltage drop from a light emission diode as the conduction voltage, or (5) a combination of one or more than one of (1) through (4).

Figures 18, 19:
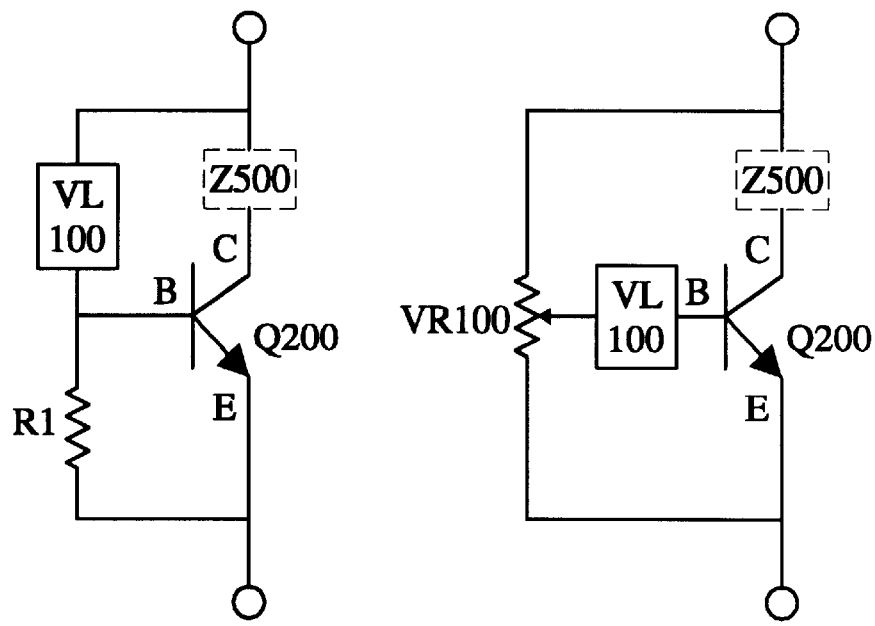
FIG. 18 is a view showing an example of a circuit of the present invention including a current dividing device with selectable conduction voltage incorporated with a power transistor.
FIG. 19 is view showing another example of a circuit of the present invention including a current dividing device with selectable conduction voltage incorporated with a power transistor.

In case a larger divided current is required in the circuit described above, a power transistor is incorporated in the voltage divider circuit device as shown in the preferred embodiment illustrated in FIG. 18. The voltage divider circuit device of this embodiment is connected in series between a collection electrode C and a base electrode of the power transistor Q200, and as required a differential resistance R1 is connected in parallel between the base electrode C and an emission electrode E so that when the voltage between the collection electrode C and the emission electrode E of the power transistor Q200 is greater than the voltage set by the voltage divider circuit device VL100 and the working voltage of the power transistor Q200 itself, the power transistor Q200 is able to execute relative conduction. In addition to being directly connected in parallel with one terminal of the voltage divider circuit device VL100 with selectable conduction voltage, the collection electrode C of the power transistor Q200 is connected in series with a resistance device Z500 before being connected in parallel with one terminal of the divided circuit device VL100.

Alternatively, as illustrated in FIG. 19, a second embodiment that includes a voltage divider circuit device uses the selectable voltage to control a power transistor. In this embodiment, a variable resistance VR100 is connected in parallel between the collection electrode C and the emission electrode E of the power transistor Q200 while an adjustable pin from the variable resistance is further connected to the base electrode B of the power transistor Q200 through the voltage divider circuit device VL100 to cause the power transistor Q200 to execute relative conduction when the voltage between the collection electrode C and the emission electrode E of the power transistor Q200 arrives at the preset value according to regulation by the variable resistance VR100. In addition to being directly connected to one fixed pin from the variable resistance VR100, the collection electrode C of the power transistor Q200 as required is first connected in series with a resistance device Z500 before being connected to one fixed pin from the variable resistance VR100.

Figure 20:
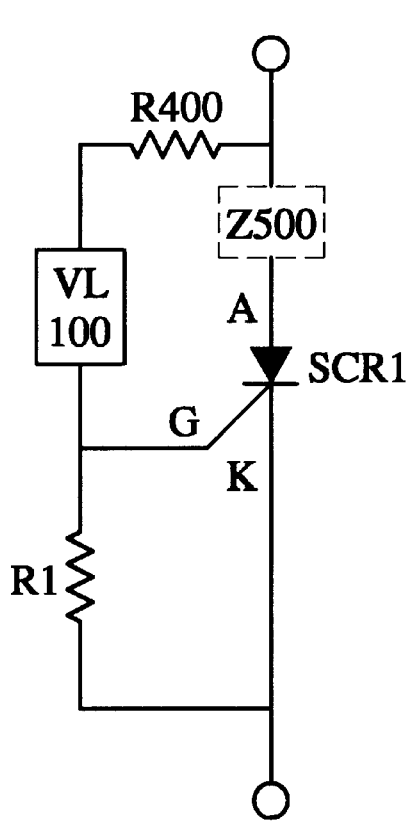
FIG. 20 is a view showing an example of a circuit of the present invention including a current dividing device with selectable conduction voltage incorporated with a gate voltage device.

FIG. 20 is a view showing an example of a circuit of the present invention comprised of voltage (or current) dividing device with selectable conduction voltage incorporated with a gate voltage device. In this embodiment, the voltage (or current) divider circuit device VL100 with selectable conduction voltage is further connected in series with a limiting resistance R400 before being further connected in series between a positive electrode A and a gate electrode G of the gate voltage device SCR1. As required a differential resistance R1 is connected in parallel between the gate electrode G and a negative electrode K so that when the voltage between the positive electrode A and the gate electrode G of the gate voltage device SCR1 is greater than the preset voltage of the divided circuit device Vl100 and the working voltage of the gate voltage device SCR1, the gate voltage device SCR1 is triggered off and conducted. In addition to being directly connected in parallel with one terminal of the divided circuit device VL100 with selectable conduction voltage, the positive electrode A of the gate voltage device SCR1 is, as required, connected in series with a resistance Z500 before being connected in parallel with a terminal of the divided circuit device VL100 with selectable conduction voltage.

Figure 21:
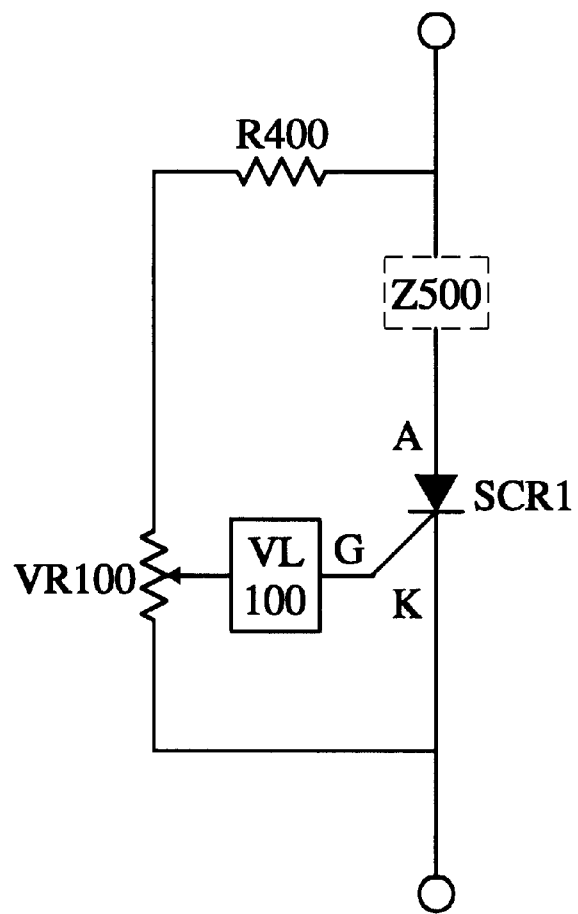
FIG. 21 is a view showing another example of a circuit of the present invention including a current dividing device with selectable conduction voltage incorporated with a gate voltage device.

FIG. 21 is a view showing another example of a circuit of the present invention comprised of a voltage (or current) dividing device with selectable conduction voltage incorporated with a gate voltage device. In this embodiment, the voltage (or current) divider circuit device VL100 with selectable conduction voltage is further connected in series with a limiting resistance R400 before being further connected in series between a positive electrode A and a negative electrode K of the gate voltage device SCR1; and an adjustable pin from the variable resistance VR100 is conducted to the Gate G of the gate voltage device SCR1 through the divided circuit device VL100, so that when the voltage between the gate electrode G and the negative electrode K arrives at the preset value, the gate voltage device SCR1 is triggered off and conducted as regulated by the variable resistance VR100. Since the voltage of gate voltage device SCR1 is greater than the preset voltage of the voltage divider circuit device Vl100 and the working voltage of the gate voltage device SCR1, the gate voltage device SCR1 triggers off the conduction. In addition to being directly connected to a fixed pin of the variable resistance VR100 (or a pin of the limiting resistance R400), the positive electrode A of the gate voltage device SCR1 is as required first connected in series with a resistance device Z500 before being connected to a fixed pin of the variable resistance VR100 (or a pin of the limiting resistance R400).

Figure 22:
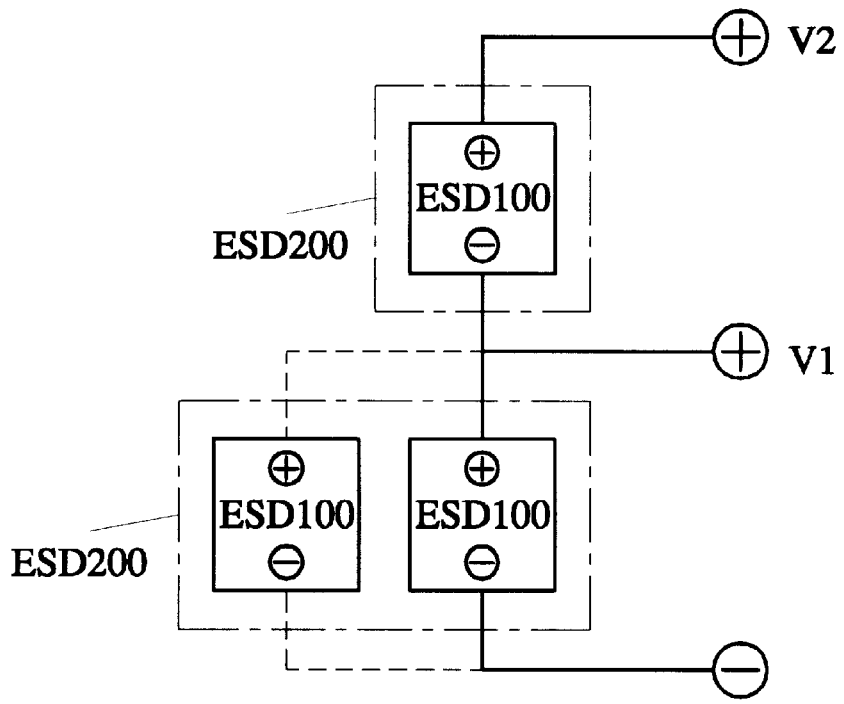
FIG. 22 is a schematic view of a circuit of a multi-step DC voltage source including multiple (dis)chargeable storage devices connected in series.
Figure 23:
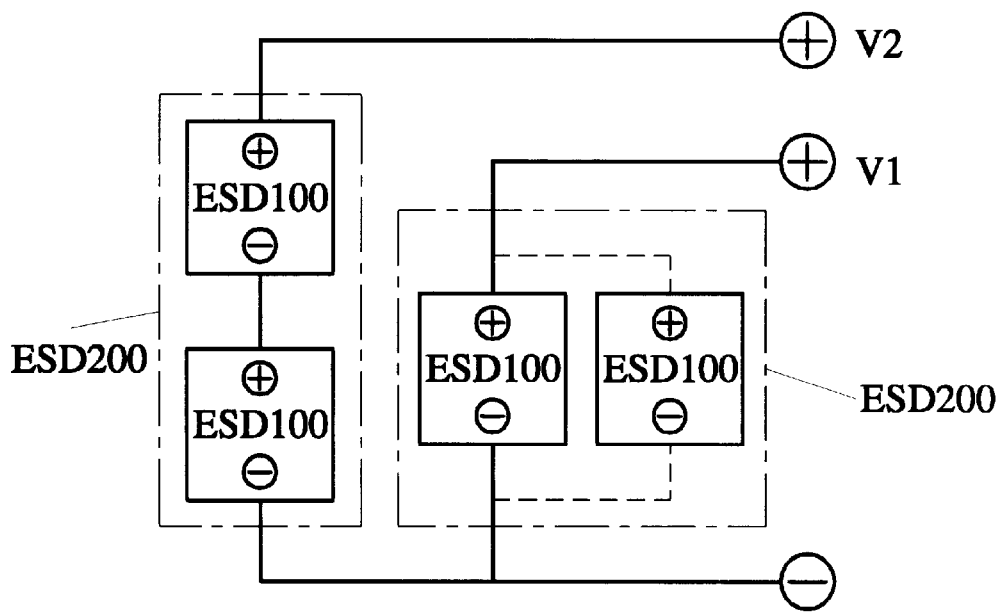
FIG. 23 is a schematic view of a circuit of a multi-step DC voltage source with common negative polarities of multiple (dis)chargeable storage devices.

The multi-step voltage charging source PS200 with two or more than two steps is comprised of:

(1) Two or more than two units of (dis)chargeable storage device ESD200 of same or different capacity, or same or different voltage, that are connected in positive sequence series to form a plurality of DC sources having two or more than two outputs with different voltages as illustrated in FIG. 22, wherein each of the one or more than one unit of (dis)chargeable storage discharging device ESD200 is comprised of one or more than one (dis)chargeable storage device ESD100 connected in series or parallel; or (2) Two or more than two units of (dis)chargeable storage discharging device ESD200 of same or different capacity, or same or different voltage that are connected by their common negative electrode (or common positive electrode) to form a plurality of voltage DC sources having two or more than two outputs with different voltages as illustrated in FIG. 23, wherein each of the one or more than one unit of (dis)chargeable storage device ESD200 is comprised of one or more than one (dis)chargeable discharging device ESD100 connected in series or parallel.

Figure 24:
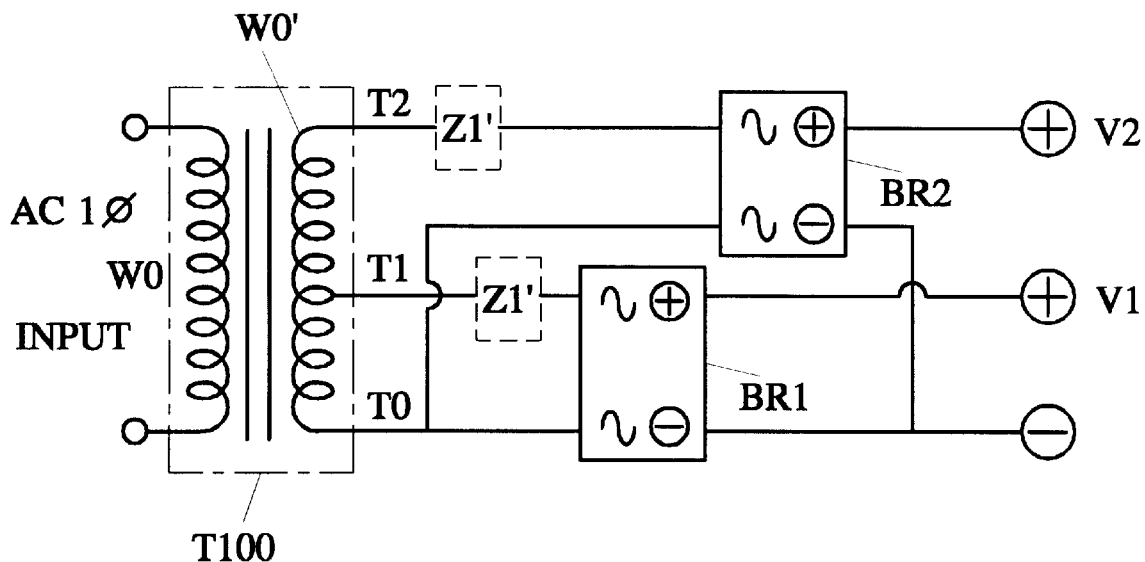
FIG. 24 is a first preferred embodiment of a multi-step voltage charging source of the present invention comprised of a single phase voltage transformer.

Alternatively, the multi-step voltage charging source PS200 may include a single-phase transformer T100 with output winding as illustrated in FIG. 24 contains an input winding W0 and an output winding W0' having two or more than two output connectors T0, T1 and T2 of different rated voltage and the same or different rated current. The output winding W0' is connected to a common output connector T0, an output connector T1 with lower voltage, and an output connector T2 with higher voltage T2. As required, the output connector T2 with higher voltage is alternatively connected in series with a resistance device Z1' before being jointly connected with the output connector T0 to a bridge type rectifier BR2, while the output connector T1 with higher voltage is alternatively connected in series with a resistance device Z1' before being jointly connected with the output connector T0 to a bridge type rectifier BR1. The negative electrode output terminal at a DC output terminal of both of the bridge type rectifier BR1 and the bridge type rectifier BR2 is jointly connected so that a positive electrode output terminal of the bridge type rectifier BR2 forms an output terminal of a charging source V2 with higher voltage of the multi-step voltage charging source PS200, and a positive electrode output terminal of the bridge type rectifier BR1 forms an output terminal of a charging source V1 with lower voltage of the multi-step voltage charging source PS200. Positive electrode output terminals of both bridge type rectifiers BR1 and BR2 are jointly connected while negative electrode output terminals of both bridge type rectifiers BR1 and BR2 provide various voltage outputs. The voltage steps of the multi-step voltage charging source PS200 may provide two or more than two steps, with the number of adapted bridge type rectifiers being increased accordingly.

Figure 25:
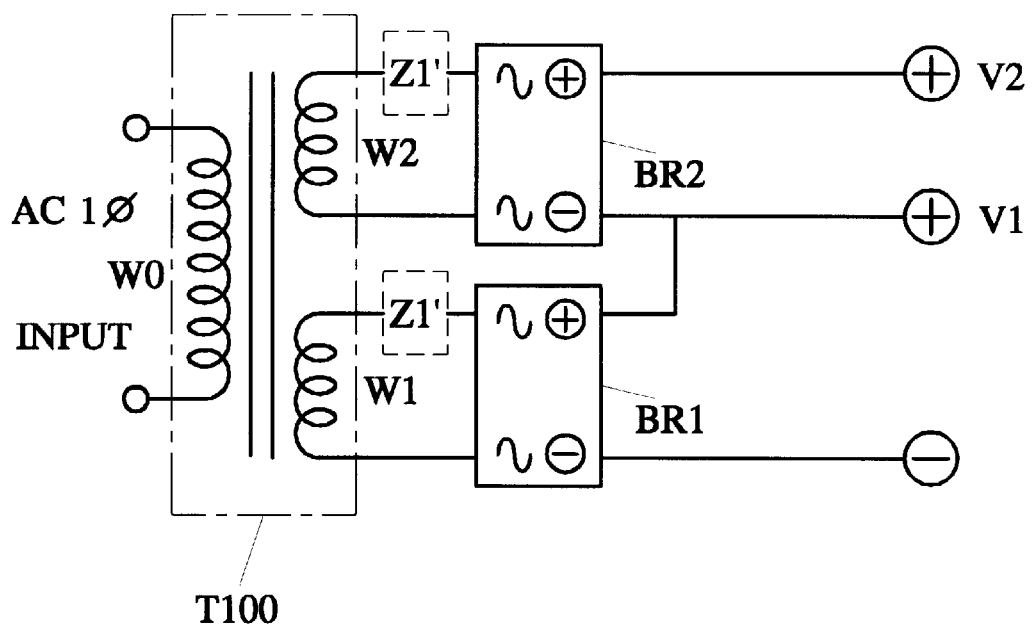
FIG. 25 is a second preferred embodiment of a multi-step voltage charging source of the present invention comprised of a single phase voltage transformer.

According to another alternative, the multi-step charging power source PS200 may include a single-phase transformer T100 with output winding as illustrated in FIG. 25. Transformer T100 contains an input winding W0 and two or more than two output windings W1 and W2 of the same or different rated voltage and the same or different rated current. As required, each unit of the output winding is respectively connected in series with a resistance device Z1' and one output winding W1 is connected to a bridge type rectifier BR1 while the other output winding W2 is connected to a bridge type rectifier BR2. A DC output terminal from the bridge type rectifier BR1 provides a positive sequence series with a DC output terminal from the bridge type rectifier BR2. having the negative electrode output terminal from the bridge type rectifier BR1 as the common negative electrode. The positive electrode output terminal of a charging source V1 with the lower voltage is comprised of a positive-sequence series provided by two units of the bridge type rectifiers BR1 and BR2 while the positive electrode output terminal of a charging source V2 with the higher voltage is comprised of the positive electrode output terminal from another unit of bridge type rectifier BR2. The voltage steps of the multi-step voltage charging source PS200 may include two or more than two steps, with the number of adapted bridge type rectifiers being increased accordingly.

Figure 26:
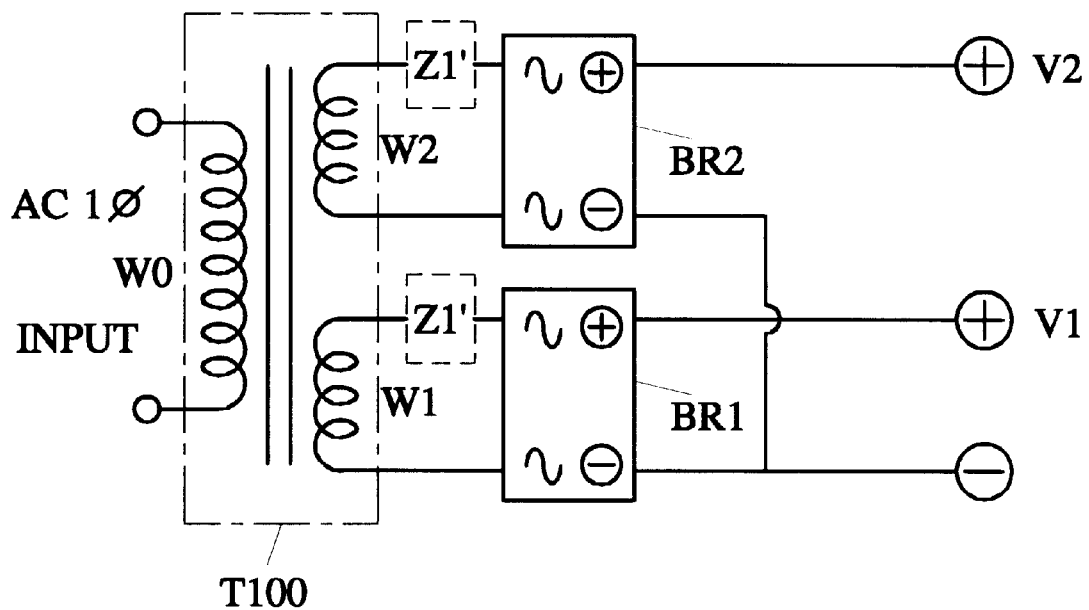
FIG. 26 is a third preferred embodiment of a multi-step voltage charging source of the present invention comprised of a single phase voltage transformer.

According to yet another alternative embodiment of the multi-step charging power source PS200, a single-phase transformer T100 with output winding as illustrated in FIG. 26 contains an input winding W0 and two or more than two output windings W1 and W2 of the same or different rated voltage and the same or different rated current. As required, each unit of output winding is respectively connected in series with a resistance device Z1' and one output winding W1 is connected to a bridge type rectifier BR1 while the other output winding W2 is connected to a bridge type rectifier BR2. A DC output negative terminal from the bridge type rectifier B1 and one from the bridge type rectifier BR2 provide a common connection and function as a common negative electrode. A positive electrode output terminal of a charging source V1 with lower voltage is comprised of the positive electrode output terminal from the bridge type rectifier BR1 while a positive electrode output terminal of a charging source V2 with higher voltage is comprised of the positive electrode output terminal from the bridge type rectifier BR2. Alternatively, the positive electrode output terminals from both bridge type rectifiers BR1 and BR2 may be jointly connected while outputs of various voltages are comprised of the negative electrode output terminals from both bridge type rectifiers BR1 and BR2. The voltage steps of the multi-step voltage charging source PS200 may include two or more than two steps and the number of adapted bridge type rectifiers be increased accordingly.

Figure 27:
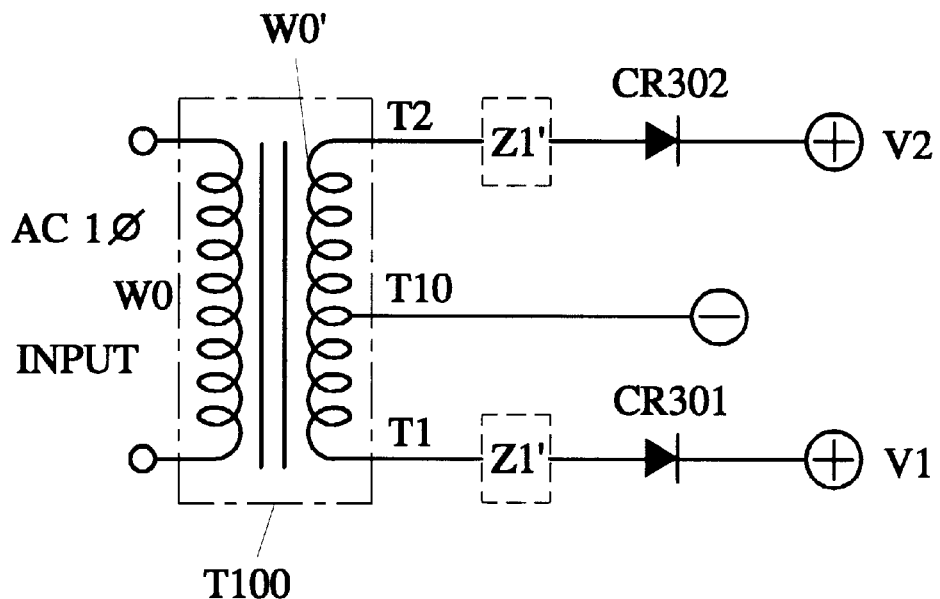
FIG. 27 is a fourth preferred embodiment of a multi-step voltage charging source of the present invention comprised of a single phase voltage transformer.

Single phase transformer T100 with output winding may also, as illustrated in FIG. 27, include an input winding W0 and an output winding W0' containing two or more than two units of transformer of different rated voltage, the same or different rated current and an intermediate output connector T10, an output connector T1 of lower voltage and an output connector T2 of higher voltage. As required, the output terminals of the output connector T1 of lower voltage and the output connector T2 of higher voltage are, in this embodiment, respectively connected in series with a resistance device Z1'. The output connector T2 of higher voltage is positive-sequence connected in series with a rectifying diode CR302 with the positive electrode output terminal from the rectifying diode CR302 forming the output positive terminal of a charging source V2 with higher voltage of the multi-step voltage charging source PS200. The output connector T1 of lower voltage is positive-sequence connected in series with a rectifying diode CR301 with a positive electrode output terminal from the rectifying diode CR301 forming an output positive terminal of the charging source V1 with lower voltage of the multi-step voltage charging source PS200. The intermediate output connector T1 forms a common negative electrode. In the circuit described above, both of the rectifying diodes CR301 and CR302 are provided in reverse direction, the negative electrode output terminals of both rectifying diodes CR301 and CR302 thereby forming various voltage outputs with the intermediate output connector T10 functioning as the common positive electrode. The voltage steps of the multi-step voltage charging source PS200 may again provide two or more than two steps and the number of the adapted rectifying diodes may again be increased accordingly.

Figure 28:
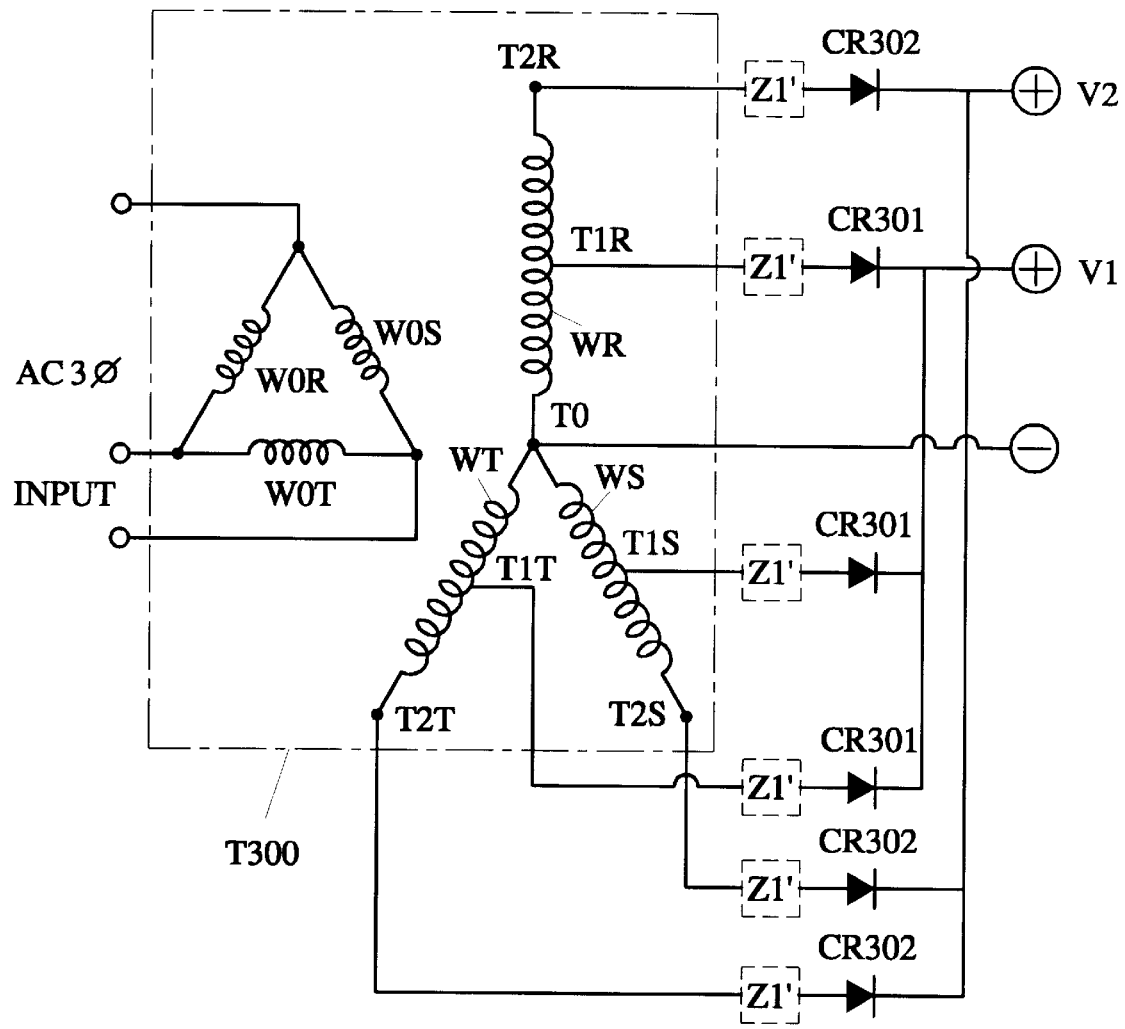
FIG. 28 is a first preferred embodiment of a multi-step voltage charging source of the present invention comprised of a three-phase voltage transformer.

As illustrated in FIG. 28, a 3-phase transformer T300 contains 3-phase input windings WOR, WOS and WOT, and two or more than two units of 3-phase output windings WR, WS and WT of different rated voltage and same or different rated current. The windings of each phase contain output connectors T2R, T2S and T2T of higher voltage and output connectors T1R, T1S and T1T of lower voltage. Windings of each phase are connected to one another by a common connector T10. The output connectors of lower voltage and the output connectors of higher voltage from each phase may be, as required, connected in series with a resistance Z1' before being connected to a rectifying diode CR301 and another rectifying diode CR302. Output terminals of the output connectors T1R, T1S and T1T of lower voltage are respectively connected to the rectifying diode CR301 and output terminals of the output connectors T2R, T2S and T2T of higher voltage are respectively connected to the rectifying diode CR302. An output positive terminal of a charging source V2 with higher voltage of the multi-step voltage charging source is comprised of the positive electrode output terminal from the rectifying diode CR302; an output positive terminal of a charging source V1 with lower voltage of the multi-step voltage charging source PS200 is comprised of the positive electrode output terminal from the rectifying diode CR301; and a negative electrode output terminal is comprised of the common connector T10 for the windings of each phase. In the circuit described above, both of the rectifying diodes CR301 and CR302 are provided in reverse direction so that the negative electrode output terminals of both rectifying diodes CR301 and CR302 form output negative terminals of various voltages with the common output connector T10 of windings of each phase functioning as the positive electrode output terminal. The voltage steps of the multi-step voltage charging source PS200 may include two or more than two steps and the number of the adapted rectifying diodes may be increased accordingly.

Figure 29:
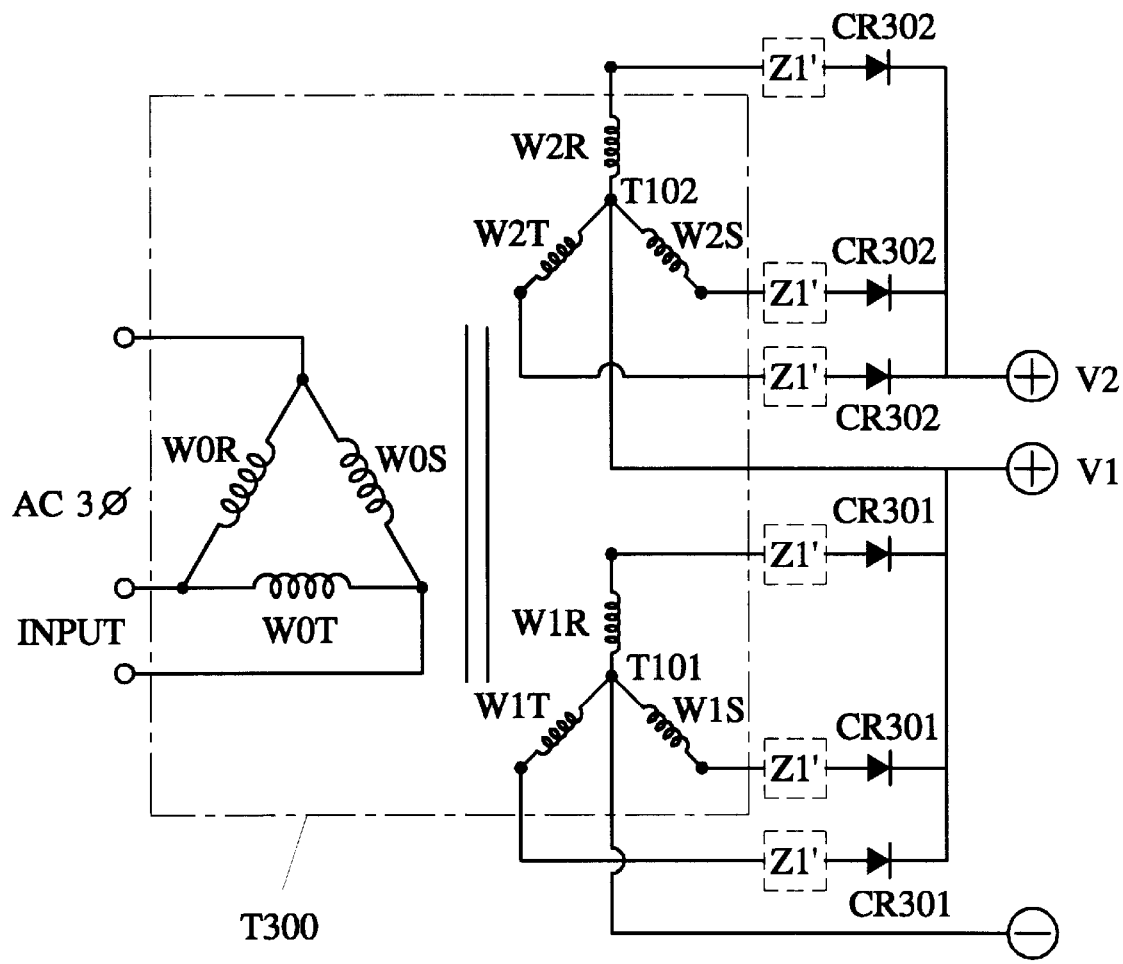
FIG. 29 is a second preferred embodiment of a multi-step voltage charging source of the present invention comprised of a three-phase voltage transformer.

As illustrated in FIG. 29, 3-phase transformer T300 contains 3-phase input windings WOR, WOS and WOT, and two or more than two units of 3-phase output windings of same or different rated voltage and same or different rated current. One of those units of 3-phase output windings contains output connectors W1R, W1S and W1T of lower voltage and a common connector T101 while the other unit of the 3-phase output windings contains output connectors W2R, W2S and W2T of higher voltage output and a common connector T102. The output connector of each unit of the output windings is, as required, connected in series with a resistance Z1'. The output windings W1R, W1S and W1T of lower voltage are respectively connected to a rectifying diode CR301 to form a positive electrode output terminal of a charging source V1 of lower voltage output, and a negative electrode output terminal is formed by the common connector T101. Another unit of output windings W2R, W2S and W2T of higher voltage are respectively connected to a rectifying diode CR302 to form a positive electrode output terminal of a charging source V2 of higher voltage output and the negative electrode output terminal is formed by the common connector T102. Both DC output terminals of lower voltage and higher voltage provide a positive sequence connection in series while a common negative electrode is formed by a DC negative electrode output terminal from either unit of the output windings. A positive electrode output terminal of the charging source V1 with lower voltage is comprised of connectors in positive sequent series connection among the DC output terminals of the lower voltage and the higher voltage while the positive electrode output terminal of the charging source V2 with higher voltage is comprised of those DC positive electrode output terminals from another unit of output windings. The voltage steps of the multi-step voltage charging source PS200 may include two or more than two steps and the number of the adapted bridge type diodes may be increased accordingly.

Figure 30:
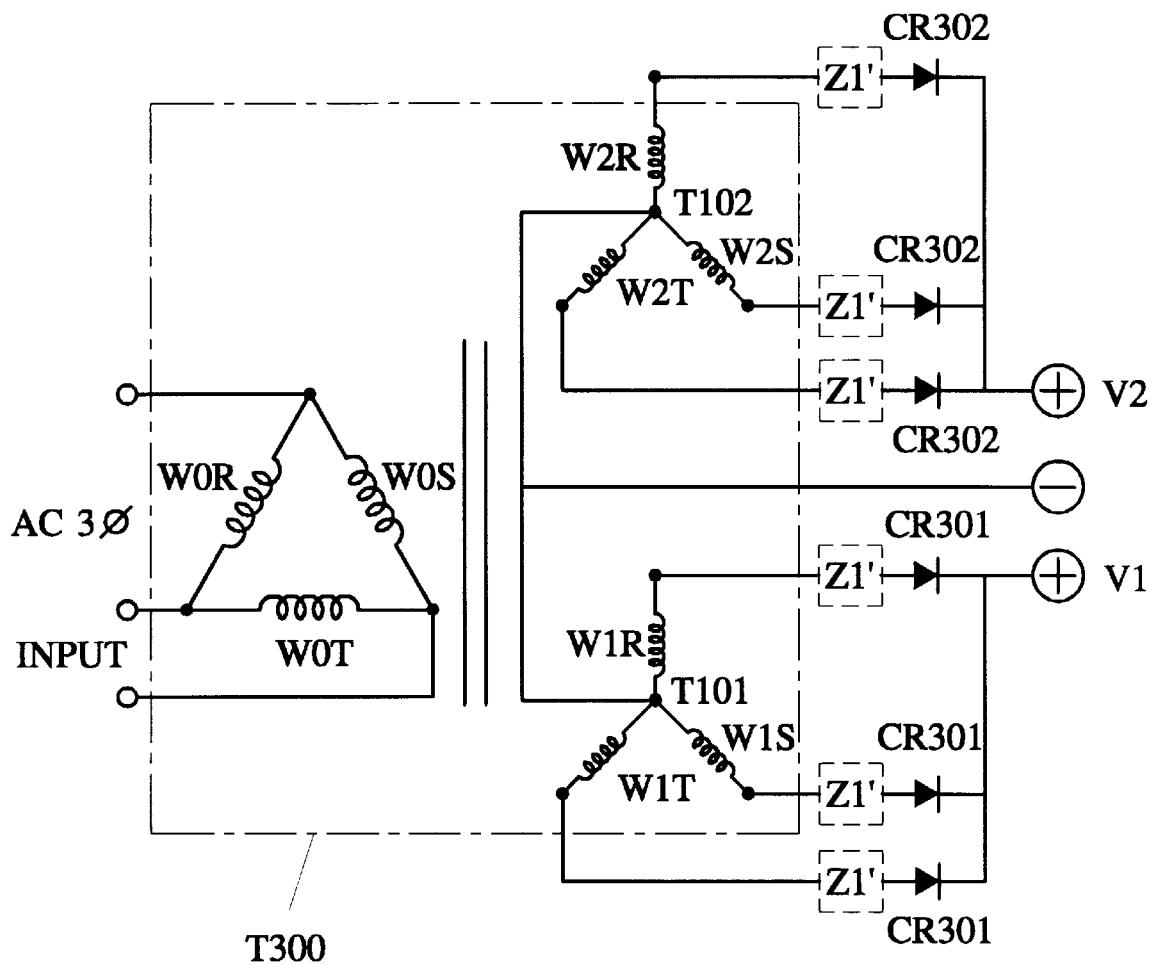
FIG. 30 is a third preferred embodiment of a multi-step voltage charging source of the present invention comprised of a three-phase voltage transformer.

As illustrated in FIG. 30, 3-phase transformer T300 contains 3-phase input windings WOR, WOS and WOT, and two or more than two units of 3-phase output windings WR, WS and WT of different rated voltage and same or different rated current. One of those units of 3-phase output windings contains output connectors W1R, W1S and W1T of lower voltage and a common connector T101 for windings of each phase with lower voltage. The other unit of the 3-phase output windings contains output connectors W2R, W2S and W2T of higher voltage output and a common connector T102 for windings of each phase with higher voltage. Output connectors W1R, W1S, W2T and W2R, W2S, W2T of each unit of the output windings is, as required, respectively connected in series with a resistance Z1' before being respectively connected to a rectifying diode CR301 and another rectifying diode CR302. The output terminals of the output windings W1R, W1S and W1T of lower voltage are respectively connected to the rectifying diode CR301 and the output terminals of the output windings W2R, W2S and W2T of higher voltage are respectively connected to the rectifying diode CR302. Those positive electrode output terminals from the rectifying diode CR302 are connected to form an output terminal with higher voltage of the multi-step voltage charging source PS200 and those positive electrode output terminals from the rectifying diode CR301 are connected to form an output terminal with lower voltage of the multi-step voltage charging source PS200. Meanwhile, both of the common connectors T101 and T102 from windings of each phase with lower voltage and higher voltage are connected to each other to form a common output terminal of a negative electrode. In the circuit described above, both of the rectifying diodes CR301 and CF302 are provided in reverse direction to form the common connection terminal output of the negative electrode of the rectifying diode CR301, with the common connection output terminals of negative electrode of the rectifying CR302 forming output terminals of various voltages. In addition, both of the common connectors T101 and T102 from windings of each phase with lower voltage and higher voltage are connected to each other to from a common output terminal of a positive electrode. The voltage steps of the multi-step voltage charging source PS200 may include two or more than two steps and the number of the adapted bridge type diodes may be increased accordingly.

Figure 31:
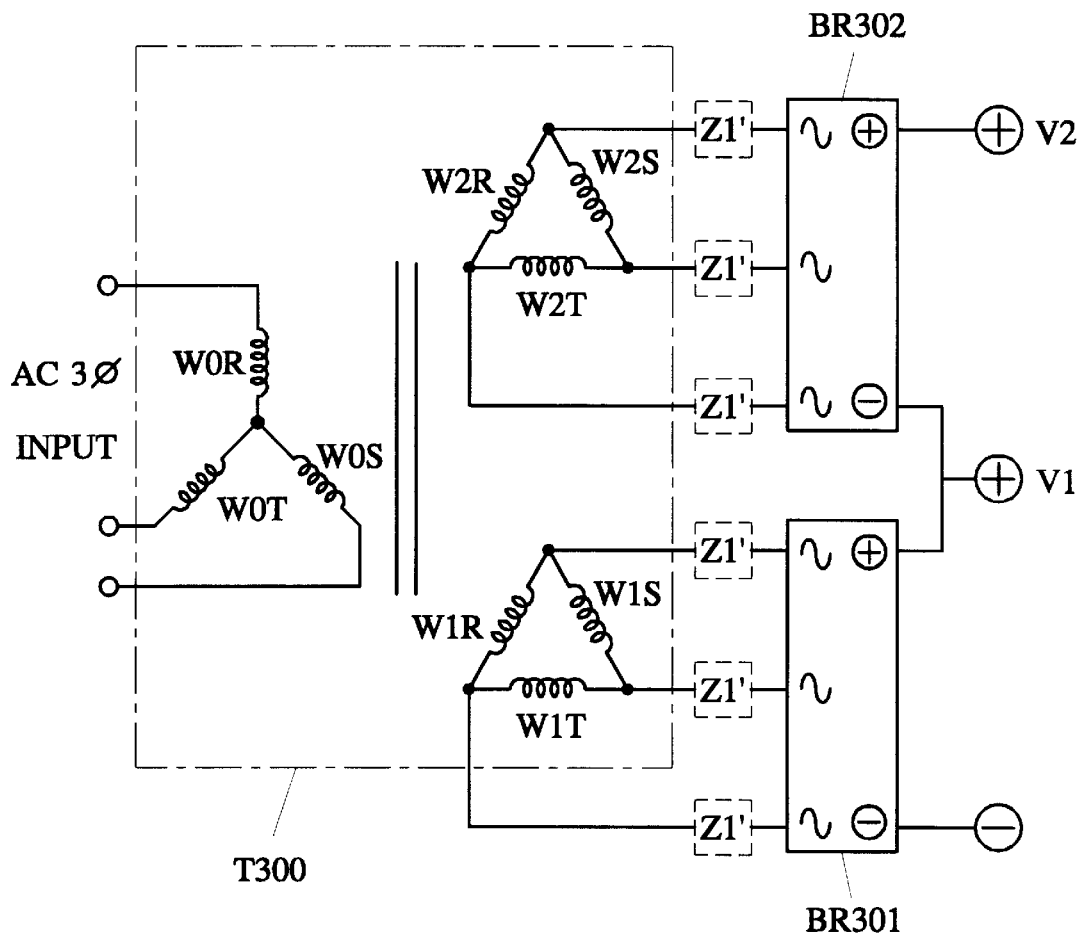
FIG. 31 is a fourth preferred embodiment of a multi-step voltage charging source of the present invention comprised of a three-phase voltage transformer.

As illustrated in FIG. 31, 3-phase transformer T300 contains 3-phase input windings WOR, WOS and WOT, and two or more than two units of 3-phase output windings of same or different rated voltage and same or different rated current. One of those units of 3-phase output windings contains output connectors W1R, W1S and W1T of lower voltage while the other unit of the 3-phase output windings contains output connectors W2R, W2S and W2T of higher voltage output. The output connectors W1R, W1S W1T and W2R, W2S, W2T of each unit of the output windings is, as required, connected in series with a resistance Z1'. The output windings W1R, W1S and W1T of lower voltage are respectively connected to a bridge type rectifier BR301 and further to the positive electrode and negative electrode output terminals of a charging source V1 of lower voltage while the other unit of output windings W2R, W2S and W2T of higher voltage are connected to a bridge type rectifier BR302 and further to the positive electrode and negative electrode of a charging source V2 of higher voltage. DC output terminals of both charging sources V1 and V2 with respective lower and higher voltages are connected in positive-sequence series with a DC negative electrode output terminal from either set of the output windings functioning as a common negative electrode. A positive electrode output terminal of the charging source V1 with lower voltage is comprised of connectors connected in positive-sequence series among the DC output terminals of lower and higher voltages while the DC positive electrode output terminals from the other unit output winding form a positive electrode output terminal of charging source V2 with higher voltage. The voltage of the multi-step voltage charging source PS200 may include two or more than two steps and the number of the adapted bridge type diodes may be increased accordingly.

Figure 32:
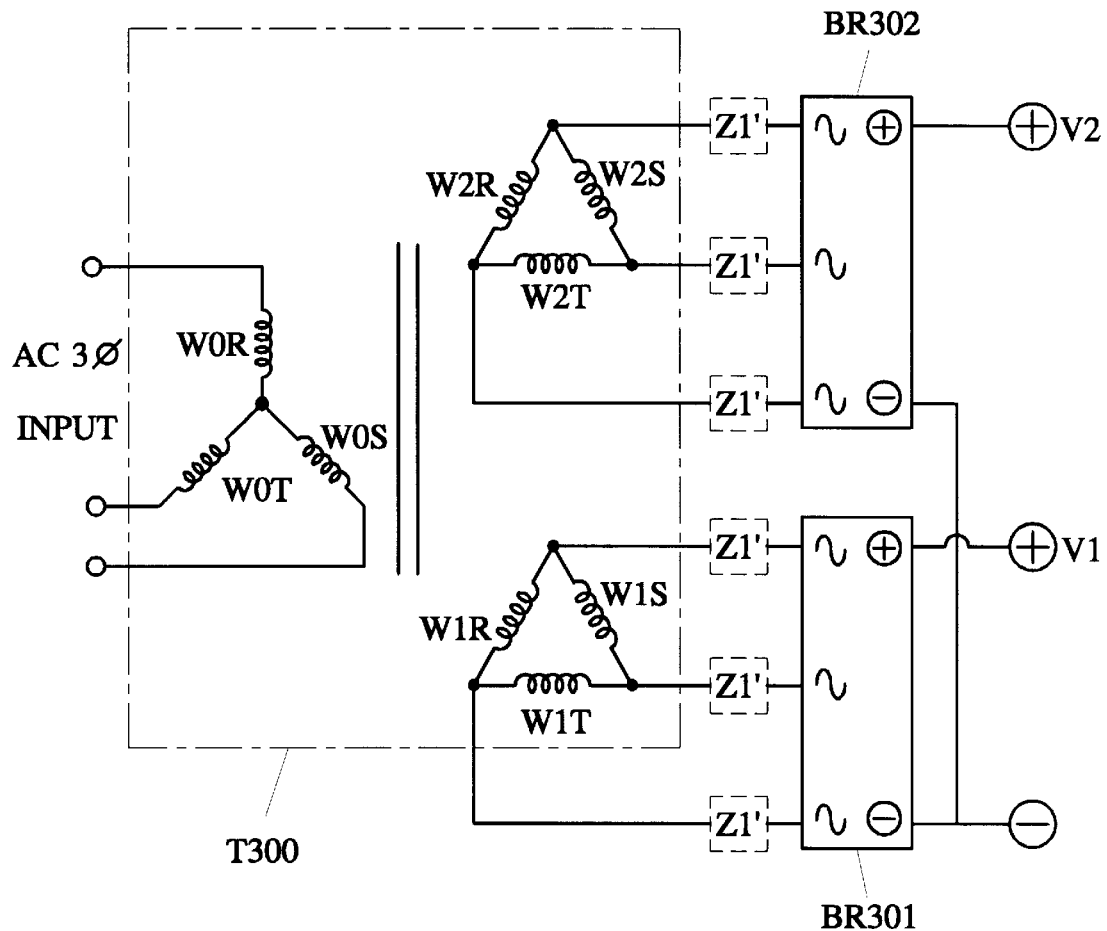
FIG. 32 is a fifth preferred embodiment of a multi-step voltage charging source of the present invention comprised of a three-phase voltage transformer; and, FIG. 33 is a schematic view of a preferred embodiment of a multi-step voltage charging source with a relay function.

As illustrated in FIG. 32, 3-phase transformer T300 contains 3-phase input windings WOR, WOS and WOT, and two or more than two units of 3-phase output windings of same or different rated voltage and same or different rated current. One of those units of 3-phase output windings contains output connectors W1R, W1S and W1T of a charging source V1 with lower voltage, and the other unit of output winding contains output connectors W2R, W2S and W2T of the output winding with higher voltage. The output connectors W1R, W1S, W1T and W2R, W2S, W1T of each unit of the output windings is, as required, connected in series with a resistance Z1'. The output windings W1R, W1S and W1T of lower voltage are outputted to a bridge type rectifier BR301 to further output the positive electrode and the negative electrode output terminals of the charging source V1 with lower voltage; the other unit output windings W2R, W2S and W2T with higher voltage are outputted to a bridge type rectifier BR302 to further output the positive electrode and the negative electrode output terminals of the charging source V2 with higher voltage. Those negative electrode output terminals of the DC output terminals from both the charging source V1 with lower voltage and the charging source V2 with higher voltage are connected to form a common negative electrode. Those DC output terminals of positive electrode with lower voltage form a positive electrode output terminal of the charging source V1 with lower voltage; and those DC output terminals of positive electrode from the other output winding with higher voltage form a positive electrode output terminal of the charging source V2 with higher voltage. Alternatively, the positive and negative electrodes described above may be replaced by each other so that a common positive electrode is comprised of the positive electrode terminal with lower voltage connected to the positive electrode terminal with higher voltage, while those negative electrode terminals with both lower and higher voltages respectively for a negative electrode form various voltage steps. Output terminals of lower voltage and higher voltage provide positive sequence connection in series while a common negative electrode is formed by a DC negative electrode output terminal from either unit of the output windings. The voltage steps of the multi-step voltage charging source PS200 may provide two or more than two steps and the number of the adapted bridge type diodes may be increased accordingly.

Figure 33:
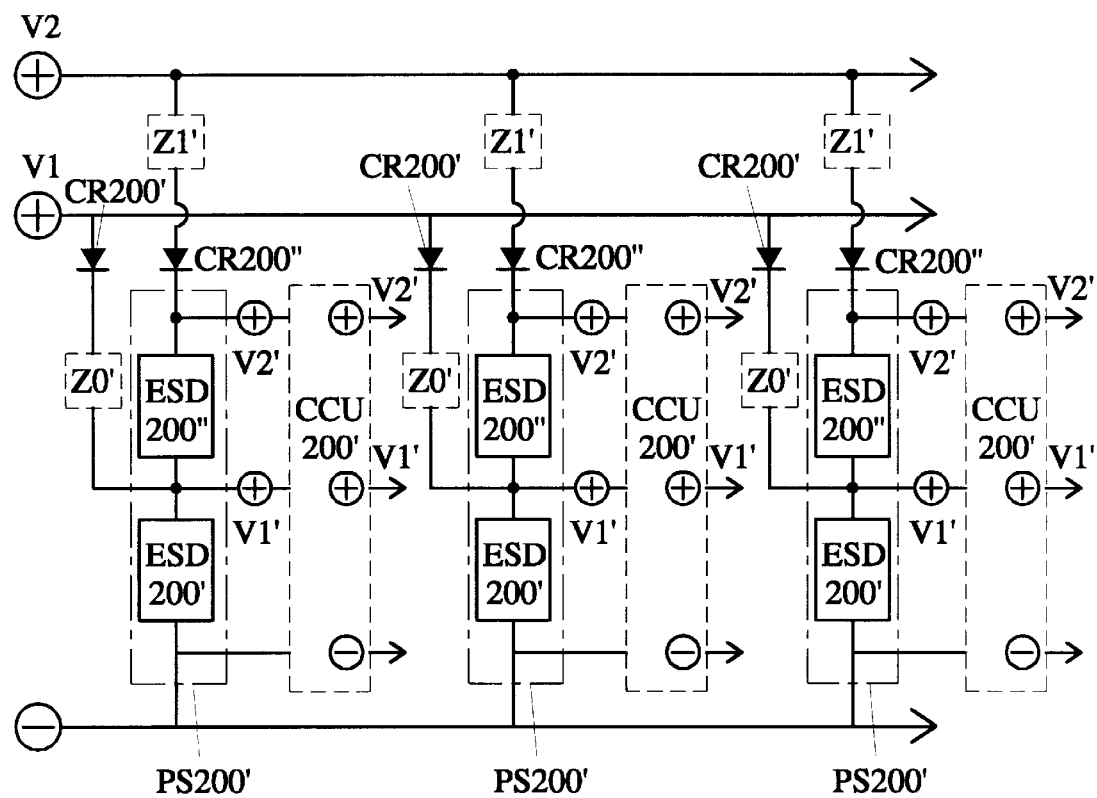

As illustrated in FIG. 33, a multi-step voltage charging source PS200' with relay function comprised of one unit or more than one unit of (dis)chargeable storage devices ESD200" and ESD200' connected in series is provided between the multi-step voltage charging source PS200 and an output load. The multi-step voltage charging source PS200' provided with relay function is adapted to an individual load having a capacity greater, smaller, or equal to that of the multi-step voltage charging source PS200. An additional resistance device Z1' is connected in series as required, and an inverse voltage prevention diode CR200" is provided between the charging source with higher voltage V2 of the multi-step voltage charging source PS200 and the charging source V2' of the (dis)chargeable storage device ESD200' with relay function. The inverse voltage prevention diode CR200" is an optional device to be provided for connection in positive-sequence series with the output terminal of the charging source V2 with higher voltage to prevent current flowing in an opposite direction, or as required one or more than one inverse voltage prevention diodes connected in series or serial-parallel may be provided to regulate the output voltage from its DC source by means of a positive-sequence drop.

Also as required, a resistance device Z0' and an inverse voltage prevention diode CR200' may be connected in series between the charging sources V1 and V1' with lower voltage respectively from the (dis)chargeable storage device ESD200" provided with relay function and the multi-step voltage charging source PS200. The inverse voltage prevention diode CR200' is an optional device to be positive-sequence connected in series with the output terminal of the charging source V1 with lower voltage or with the output terminal from other voltage with lower step to prevent current flowing in an opposite direction. Alternatively, as required, one or more than one inverse voltage prevention diodes connected in series or series-parallel may be provided to regulate the output voltage of DC source by means of a positive-sequence drop.

One unit or more than one unit of multi-step voltage charging source PS200' provided with relay function is connected in parallel with the multi-step voltage charging source PS200, and then is further connected to the load through the negative electrodes from the output terminal of the charging source V2' with higher voltage and the output terminal of the charging V1' with lower voltage of the multi-voltage charging source PS200', or connected to an optional center control unit CCU200' for control of relay function before being connected to the load. The central control unit CCU200' for controlling the relay function is a device containing an electromechanical or solid-state power switch comprised of a drive circuit to control the operation of DC output voltage conversion, On-Off operation or timed cutoff, by controlling the operation of the drive circuit so to control the operation of the primary control switch SW1, which in turn is comprised of a solid-state or analog switching device, an electromechanical switching device, or a constantly closed thermal temperature switch, thereby facilitating On-Off operation and timed cutoff output to the charging DC source.

As disclosed above, the charging device with multi-step voltage charging source of the present invention controls the voltage of its charging source for controlling the operation of the charging current outputted from the charging device in the charging process to the (dis)chargeable storage device so that when its charging arrives at the preset voltage, a cutoff is executed by the primary control switch connected in series with the set voltage detection & drive circuit and the charging circuit to stop charging of the (dis)chargeable storage device. The concepts of the circuit and the operation of the multi-step voltage of the present invention significant reduce costs of hardware facilities required by the primary control switch, offering a simplified circuit, innovative concepts, and economic benefit.

What is claimed is:

1. A charging device including a multi-step voltage source for providing automatic control of charging current supplied to a chargeable storage device, comprising:
   a multi-step voltage source arranged to output at least two charging voltages;
   a central control unit arranged to control operation of the multi-step voltage source, wherein said multi-source is caused to output a first current at a first voltage during charging of the chargeable storage device to a preset voltage, and to output a second current smaller than the first current at a voltage higher than the first voltage following charging of the chargeable storage device to the preset voltage;
   a primary control switch connected in series with the charging circuit for cutting off supply of charging current to the chargeable storage device.

2. A charging device including a multi-step voltage source for providing automatic control of charging current supplied to a chargeable storage device as claimed in claim 1, further comprising a resistance device connected in series with an output terminal of a lower voltage stage of the multi-step voltage source to limit a current output by the lower voltage stage.

3. A charging device including a multi-step voltage source for providing automatic control of charging current supplied to a chargeable storage device as claimed in claim 2, further comprising a resistance device connected in series with an output terminal of a higher voltage stage of the multi-step voltage source to limit a current output by the higher voltage stage.

4. A charging device including a multi-step voltage source for providing automatic control of charging current supplied to a chargeable storage device as claimed in claim 3, further comprising a voltage detection and drive circuit connected in parallel with the multi-step voltage source for driving said primary control switch when a terminal voltage of the voltage detection and drive circuit reaches said preset voltage.

5. A charging device including a multi-step voltage source for providing automatic control of charging current supplied to a chargeable storage device as claimed in claim 1, further comprising a limiting resistance for enabling a small current to flow to the chargeable storage device when said primary control switch is cut-off.

6. A charging device including a multi-step voltage source for providing automatic control of charging current supplied to a chargeable storage device as claimed in claim 1, wherein the primary control switch is a constantly closed thermal temperature switch arranged to cut-off charging current when a temperature of the battery reaches a predetermined temperature.

7. A charging device including a multi-step voltage source for providing automatic control of charging current supplied to a chargeable storage device as claimed in claim 1, further comprising a conduction contact set for electrically connecting said chargeable storage device to said multi-step voltage source.

8. A charging device including a multi-step voltage source for providing automatic control of charging current supplied to a chargeable storage device as claimed in claim 1, further comprising an isolating diode connected between the charging source and the chargeable storage device to regulate an output voltage of the multi-step voltage source.

9. A charging device including a multi-step voltage source for providing automatic control of charging current supplied to a chargeable storage device as claimed in claim 1, further comprising an inverse voltage prevention diode connected in series with a lower voltage output terminal of the multi-step voltage source.

10. A charging device including a multi-step voltage source for providing automatic control of charging current supplied to a chargeable storage device as claimed in claim 1, further comprising a secondary resistance connected in parallel with a pilot drive power control device, said pilot drive power control device being arranged to cause said primary control switch to cut-off charging of the chargeable storage device, and said secondary resistance being arranged to divide a current supplied to said pilot drive power control device and thereby reduce a charging current before cut-off.

11. A charging device including a multi-step voltage source for providing automatic control of charging current supplied to a chargeable storage device as claimed in claim 10, wherein the primary control switch is an electromechanical switch having a drive coil, and the pilot drive power control device is a zener diode connected in series with the drive coil.

12. A charging device including a multi-step voltage source for providing automatic control of charging current supplied to a chargeable storage device as claimed in claim 1, further comprising a relay transistor connected in parallel with a pilot drive power control device to cause the pilot drive power control device to trigger the primary control switch and regulate a shunting ratio to decrease a charging current to the chargeable storage device.

13. A charging device including a multi-step voltage source for providing automatic control of charging current supplied to a chargeable storage device as claimed in claim 1, further comprising a conductive contact arrangement for facilitating selection of different circuit configurations.

14. A charging device including a multi-step voltage source for providing automatic control of charging current supplied to a chargeable storage device as claimed in claim 13, wherein the primary switch is provided on a power supply side of the contact arrangement.

15. A charging device including a multi-step voltage source for providing automatic control of charging current supplied to a chargeable storage device as claimed in claim 13, wherein the primary control switch and a pilot drive power control device are provided on a load side of the contact arrangement and a voltage detection and drive device is connected in parallel on a power supply side of the contact arrangement.

16. A charging device including a multi-step voltage source for providing automatic control of charging current supplied to a chargeable storage device as claimed in claim 13, wherein the primary control switch, a pilot drive power control device, and a voltage detection and drive device are all connected on a power supply side of the contact arrangement.

17. A charging device including a multi-step voltage source for providing automatic control of charging current supplied to a chargeable storage device as claimed in claim 13, wherein the primary control switch, a pilot drive power control device, and a voltage detection and drive device are all connected on a battery side of the contact arrangement.

18. A charging device including a multi-step voltage source for providing automatic control of charging current supplied to a chargeable storage device as claimed in claim 1, further comprising a voltage divider circuit having a selectable conduction voltage and connected in parallel with the multi-step voltage source for driving said primary control switch when a terminal voltage of the voltage detection and drive circuit reaches said preset voltage.

19. A charging device including a multi-step voltage source for providing automatic control of charging current supplied to a chargeable storage device as claimed in claim 18, wherein said voltage divider circuit is connected in series between a collection electrode and a base electrode of a power transistor such that when a voltage between the collection electrode and an emitter electrode of the power transistor is greater than a voltage set by the divider circuit and a working voltage of the power transistor, the power transistor causes said primary control switch to cut-off said charging.

20. A charging device including a multi-step voltage source for providing automatic control of charging current supplied to a chargeable storage device as claimed in claim 1, wherein said multi-stage voltage source comprises a plurality of DC voltage sources, said plurality of DC voltage sources being connected in varying combinations to different voltage output terminals of said multi-step voltage source.

21. A charging device including a multi-step voltage source for providing automatic control of charging current supplied to a chargeable storage device as claimed in claim 20, wherein a lower voltage stage of said multi-step voltage source is formed by a single DC voltage source and a higher stage of said voltage source is formed by multiple DC voltage sources.

22. A charging device including a multi-step voltage source for providing automatic control of charging current supplied to a chargeable storage device as claimed in claim 20, wherein a higher voltage stage of said multi-step voltage source is formed by a plurality of DC voltage sources connected in series.

23. A charging device including a multi-step voltage source for providing automatic control of charging current supplied to a chargeable storage device as claimed in claim 22, wherein a lower voltage stage of said multi-step voltage source is formed by a plurality of DC voltage sources connected in parallel.

24. A charging device including a multi-step voltage source for providing automatic control of charging current supplied to a chargeable storage device as claimed in claim 20, wherein different voltage outputs of said multi-step voltage source are connected through at least one bridge rectifier to different windings of a single phase transformer having an AC output.

25. A charging device including a multi-step voltage source for providing automatic control of charging current supplied to a chargeable storage device as claimed in claim 1, wherein different voltage outputs of said multi-step voltage source are connected to different windings of single phase a transformer through at least two rectifying diodes.

26. A charging device including a multi-step voltage source for providing automatic control of charging current supplied to a chargeable storage device as claimed in claim 1, wherein different voltage outputs of said multi-step voltage source are connected to different windings of single phase a transformer through at least one bridge rectifier.

27. A charging device including a multi-step voltage source for providing automatic control of charging current supplied to a chargeable storage device as claimed in claim 1, wherein different voltage outputs of said multi-step voltage source are connected to different secondary windings of three phase a transformer through at least two rectifying diodes.

28. A charging device including a multi-step voltage source for providing automatic control of charging current supplied to a chargeable storage device as claimed in claim 1, further comprising additional said multi-step voltage sources connected in series and having a relay function.

* * * * *